(12) United States Patent
Kimura

(10) Patent No.: US 11,989,315 B2
(45) Date of Patent: May 21, 2024

(54) INFORMATION PROCESSING APPARATUS, SERVICE PROVIDING SYSTEM, AND METHOD TO MODIFY A LICENSE BASED ON USAGE

(71) Applicant: Yohta Kimura, Tokyo (JP)

(72) Inventor: Yohta Kimura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 256 days.

(21) Appl. No.: 17/467,458

(22) Filed: Sep. 7, 2021

(65) Prior Publication Data

US 2022/0075888 A1  Mar. 10, 2022

(30) Foreign Application Priority Data

Sep. 8, 2020  (JP) .................................. 2020-150683
Jul. 28, 2021  (JP) .................................. 2021-122909

(51) Int. Cl.
*G06F 21/62* (2013.01)
*G06F 21/12* (2013.01)
*G06F 21/10* (2013.01)
*H04N 1/00* (2006.01)
*H04N 1/44* (2006.01)

(52) U.S. Cl.
CPC ........ *G06F 21/6218* (2013.01); *G06F 21/121* (2013.01); *G06F 21/1075* (2023.08); *H04N 1/00244* (2013.01); *H04N 1/00411* (2013.01); *H04N 1/4413* (2013.01); *H04N 1/4433* (2013.01)

(58) Field of Classification Search
CPC .............. G06F 21/6218; G06F 21/121; G06F 2221/0768; G06F 21/62; G06F 21/12; H04N 1/00244; H04N 1/00411; H04N 1/4413; H04N 1/4433
See application file for complete search history.

(56) References Cited

U.S. PATENT DOCUMENTS

| | | | | |
|---|---|---|---|---|
| 2013/0144742 A1* | 6/2013 | Thakur | ................. | G06F 21/105 |
| | | | | 705/26.1 |
| 2016/0226663 A1* | 8/2016 | Jones | .................... | G06F 21/121 |
| 2021/0182363 A1* | 6/2021 | Dickson | ................ | G06F 21/602 |

FOREIGN PATENT DOCUMENTS

| | | |
|---|---|---|
| JP | 2001-036673 | 2/2001 |
| JP | 2007-094516 | 4/2007 |
| JP | 2016-004307 | 1/2016 |

* cited by examiner

*Primary Examiner* — Quazi Farooqui
(74) *Attorney, Agent, or Firm* — XSENSUS LLP

(57) ABSTRACT

An information processing apparatus, a service providing system, and a method. The information processing apparatus stores in one or more memories, information on execution of each of a plurality of applications, which are available for use under a license contract and outputs suggestion to change the license contract according to a usage count of each application obtained from the information on execution of each application.

17 Claims, 24 Drawing Sheets

FIG. 6

| DATE AND TIME | APPLICATION ID | APPLICATION TYPE | COMPATIBLE APPLICATION ID | USER ID | USER ROLE | GUEST USER | PACKAGE ID | TENANT ID |
|---|---|---|---|---|---|---|---|---|
| 201901010101 | 1111111 | SCAN | 999999,888888 | 111111 | GENERAL | TRUE | 44444 | 9876 |
| 201901010102 | 2222222 | PRINT | | 111111 | GENERAL | FALSE | 55555 | 9876 |
| 201901010103 | 3333333 | DEVICE | 777777 | 222222 | POWER USER | FALSE | 66666 | 9876 |
| 201901010104 | 4444444 | SCAN | | 333333 | GENERAL | TRUE | 77777 | 9876 |

FIG. 8

| PACKAGE | SUBSCRIPTION FEE PER USER PER MONTH | NUMBER OF CONTRACTED USER | SUBSCRIPTION FEE PER PACKAGE |
|---|---|---|---|
| A | 100 | 50 | 5000 |
| B | 800 | 10 | 8000 |
| C | 900 | 100 | 90000 |
| D | 1000 | 5 | 5000 |

FIG. 9

| PACKAGE | SUBSCRIPTION FEE PER DEVICE PER MONTH | NUMBER OF CONTRACTED DEVICE | SUBSCRIPTION FEE PER PACKAGE |
|---|---|---|---|
| A | 10000 | 1 | 10000 |
| B | 2000 | 2 | 4000 |
| C | 3000 | 2 | 6000 |
| D | 10000 | 1 | 10000 |

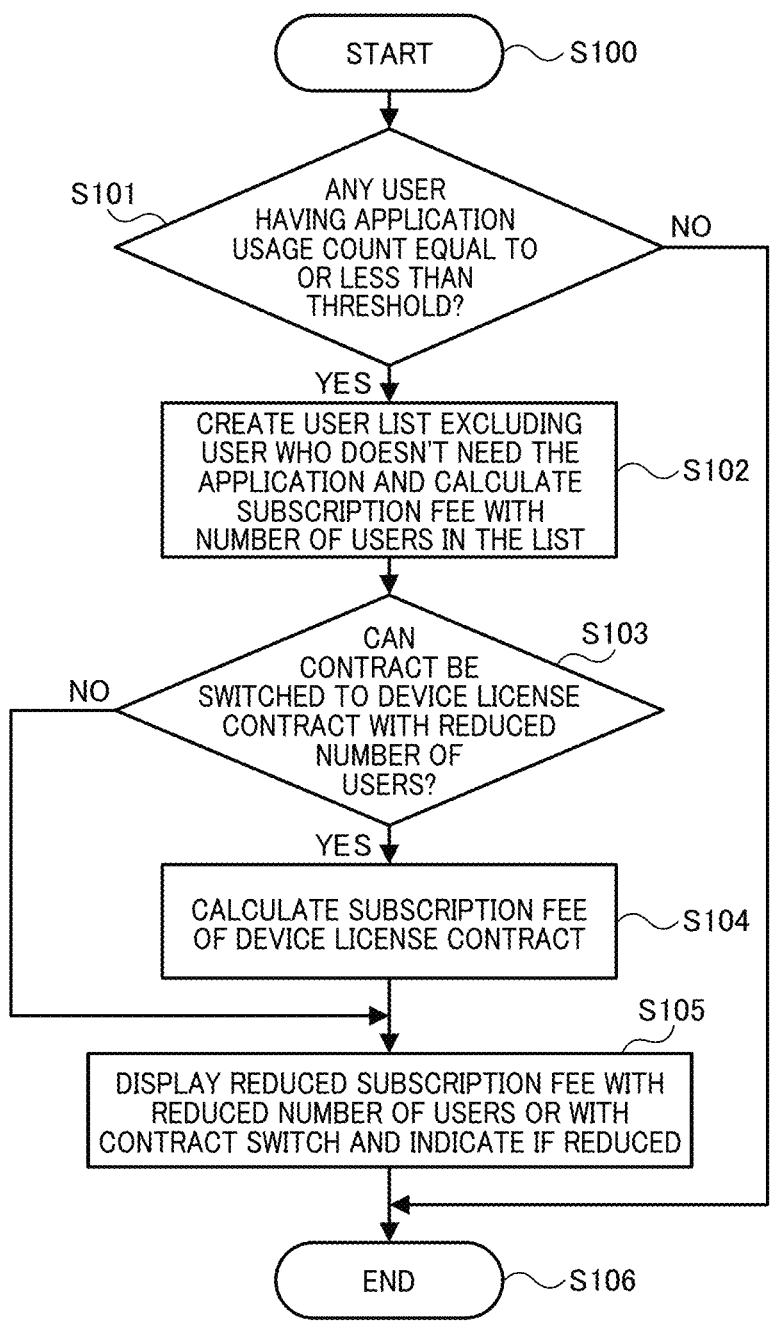

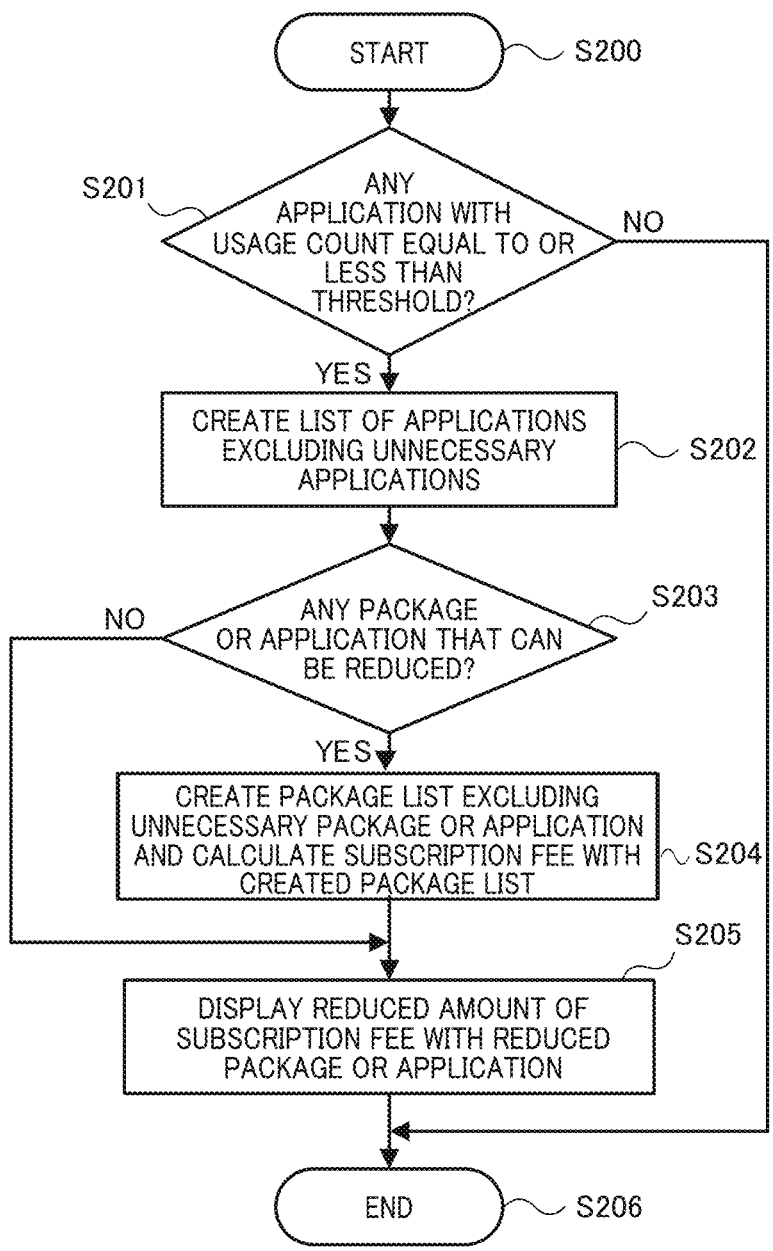

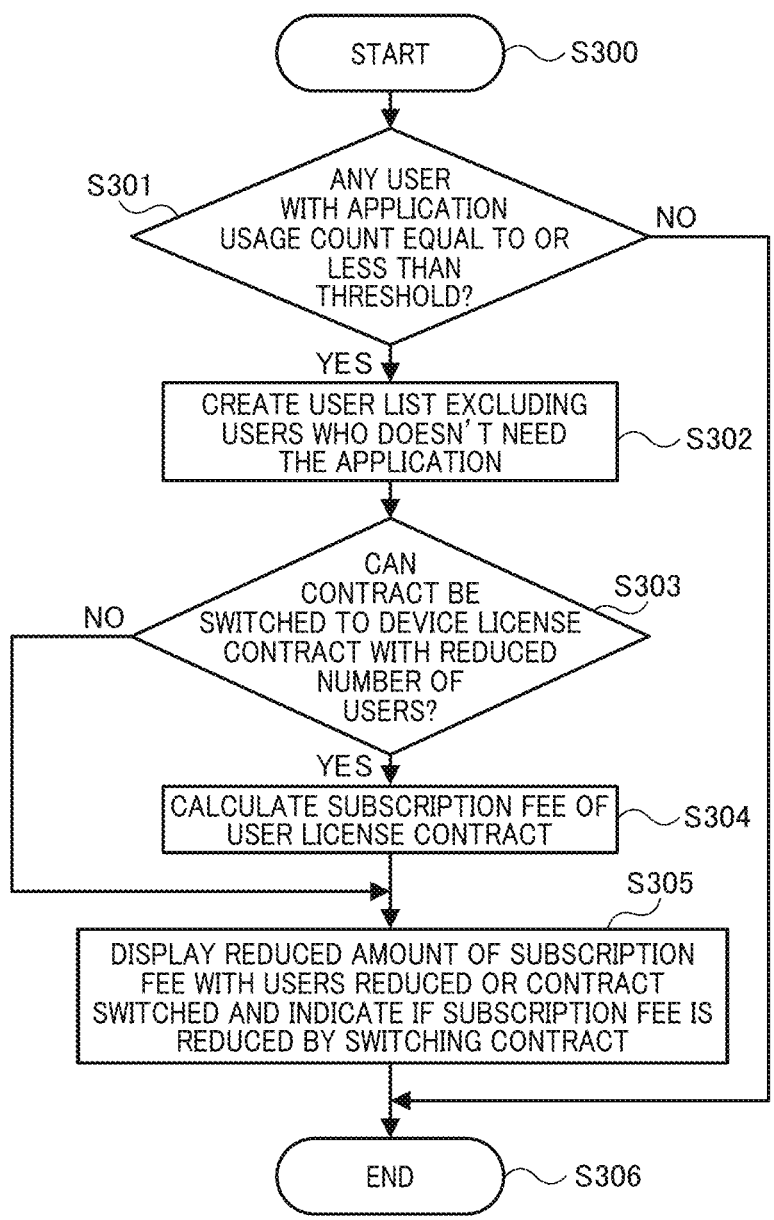

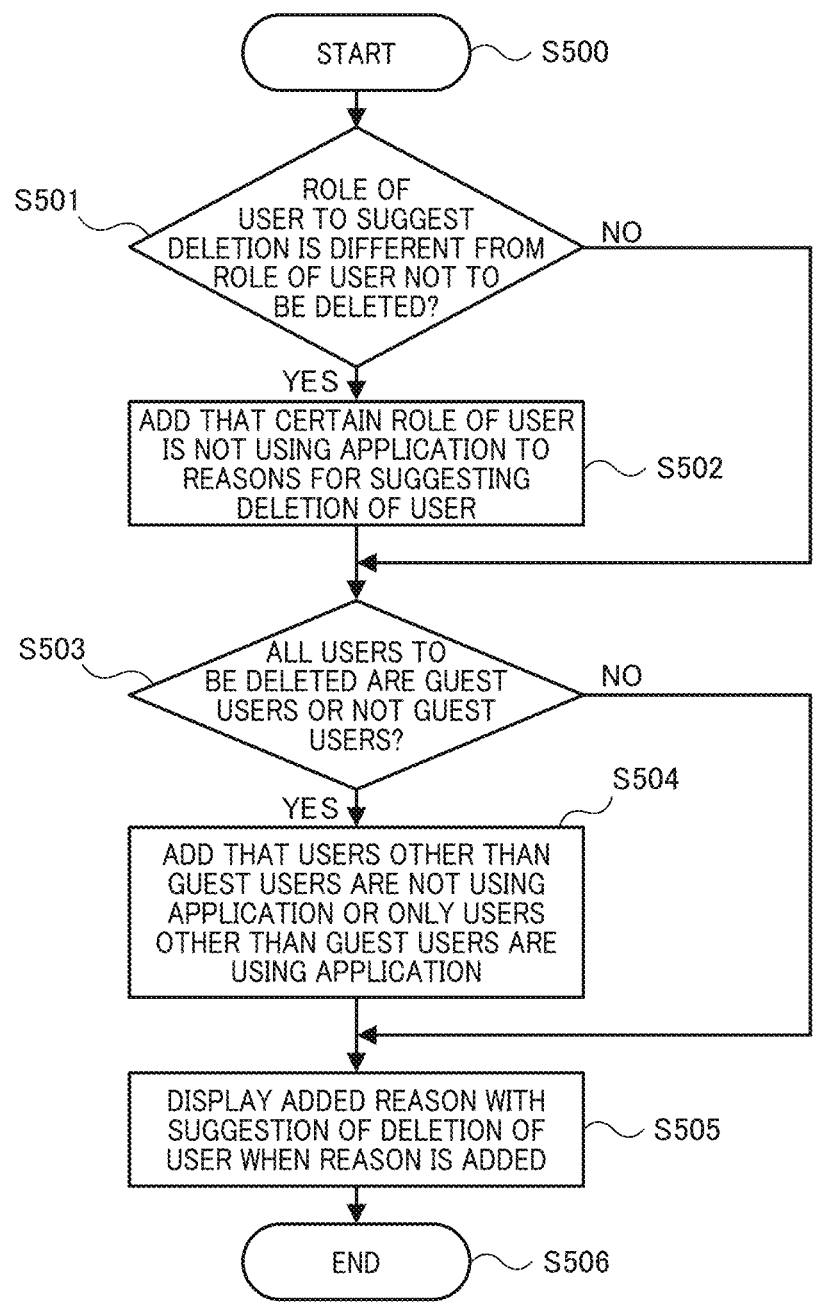

INFORMATION PROCESSING APPARATUS, SERVICE PROVIDING SYSTEM, AND METHOD TO MODIFY A LICENSE BASED ON USAGE

CROSS-REFERENCE TO RELATED APPLICATIONS

This patent application is based on and claims priority pursuant to 35 U.S.C. § 119(a) to Japanese Patent Applications No. 2020-150683, filed on Sep. 8, 2020, and No.2021-122909, filed on Jul. 28, 2021 in the Japan Patent Office, the entire disclosure of which is hereby incorporated by reference herein.

BACKGROUND

Technical Field

The present disclosure relates to an information processing apparatus, a service providing system, and a method.

Related Art

An apparatus such as a multifunction peripheral (MFP) includes a device that can provide services such as distribution of scanned document and printing of saved document in cooperation with a cloud service. A function provided as a service is implemented by an application, and a subscription fee is set for use of the application. A user can select a set subscription fee, conclude a license contract with the selected subscription fee, and use the application according to the license contract.

Depending on usage status of the application, a lower subscription fee may be available, and suggesting the lower subscription fee to the user can improve satisfaction of the user.

SUMMARY

Embodiments of the present disclosure describe an information processing apparatus, a service providing system, and a method. The information processing apparatus stores in one or more memories, information on execution of each of a plurality of applications, which are available for use under a license contract and outputs suggestion to change the license contract according to a usage count of each application obtained from the information on execution of each application.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating an example of information stored in an application execution data storage database;

FIG. 8 is a diagram illustrating an example of a user license subscription fee information stored in a user/device license subscription fee database;

FIG. 9 is a diagram illustrating an example of device license subscription fee information stored in the user/device license subscription fee database;

FIG. 12 is a flowchart illustrating a process for suggesting a license contract with a reduced number of users;

FIG. 14 is a flowchart illustrating a process for suggesting a license contract with a reduced number of applications;

FIG. 15 is a flowchart illustrating a process for suggesting a license contract with a reduced number of users;

FIG. 24 is a flowchart illustrating an example of a process for preparing the reason for reducing the number of users;

Figure 1:
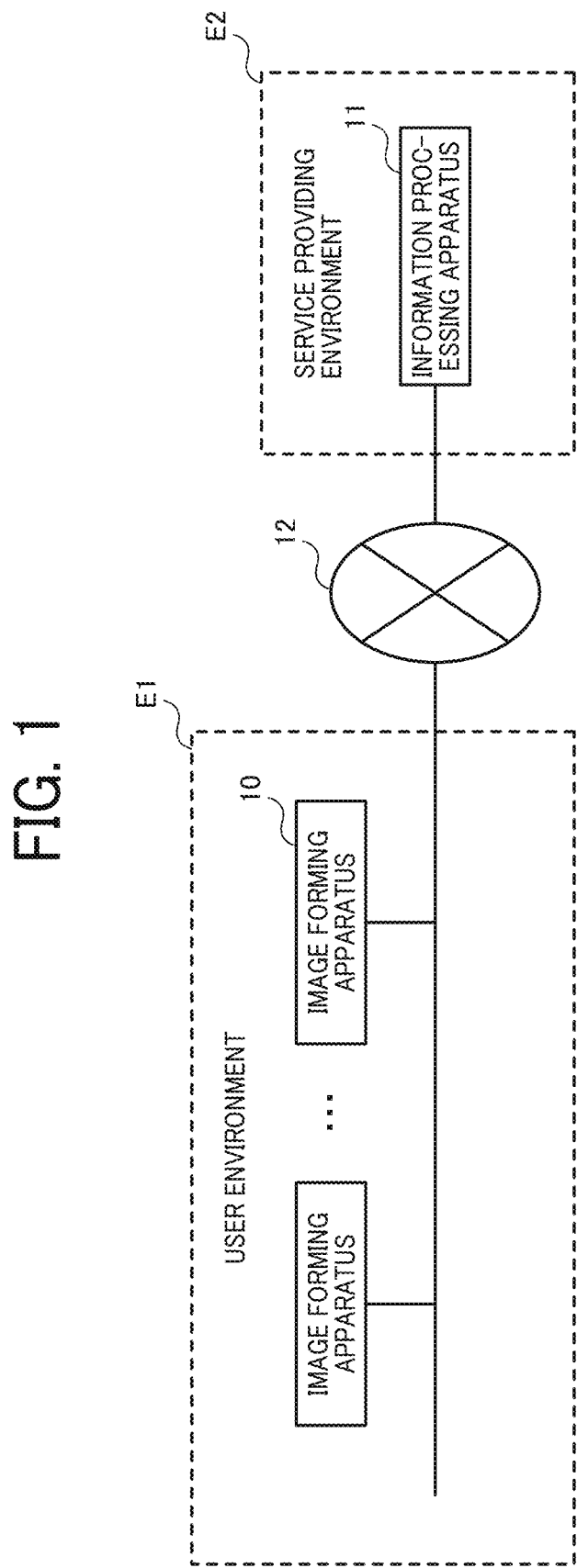
FIG. 1 is a block diagram illustrating an example of a configuration of a service providing system.

The accompanying drawings are intended to depict embodiments of the present invention and should not be interpreted to limit the scope thereof The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, the present disclosure is described with reference to embodiments, but the present disclosure is not limited to the embodiments described below.

FIG. 1 is a diagram illustrating a configuration of a service providing system. The service providing system includes one or more image forming apparatuses 10 installed in a user environment E1 and an information processing apparatus 11 installed in a service providing environment E2. One or more image forming apparatuses 10 and the information processing apparatus 11 are connected through a network 12 such as the interne and communicate with each other through the network 12. The information processing apparatus 11 operates in cooperation with one or more image forming apparatuses 10 through the network 12.

Here, a device residing in the user environment E1 is described as an image forming apparatus 10 such as an MFP, but the device that operates in cooperation with the information processing apparatus 11 is not limited to the image forming apparatus 10 as long as the device includes a communication function. Examples of such device include, a projector (PJ), an interactive whiteboard (IWB), an industrial machine, an imaging device, a sound collecting device, a medical device, a network home appliance, an automobile (connected car), a notebook personal computer (PC), a mobile phone, a smartphone, a tablet terminal, a game machine, a personal digital assistant (PDA), a wearable PC, a desktop PC, and the like.

The image forming apparatus 10 includes a plurality of functions such as a scanning function, a copying function, a printing function, a facsimile function, a communication function, and performs image forming. The image forming apparatus 10 includes an operation unit that receives user input and displays a processing status, an error, and the like, and an image forming unit that implements each function. The image forming apparatus 10 accesses the information processing apparatus 11 using a web browser, executes various applications installed in the information processing apparatus 11, and implements each function.

The information processing apparatus 11 implements a web server, communicates with the image forming apparatus 10, executes various application processes, and provides a service to the user. Examples of application processes include storing a file in a specific directory in a cloud storage, reading data, and distributing the data to a specific distribution destination. Since these processes are examples, the processes of the application are not limited to the above description.

The information processing apparatus 11 manages users who use the application in a unit called tenant. One or more users can belong to the tenant. The application can be registered to the tenant, but the application cannot be registered directly to the tenant. The applications are grouped into a unit called package and registered in the tenant. The package is a collection of one or more applications. The package may include one application or a plurality of applications.

The package includes free package and paid package. To use the paid package, a device license contract including monthly subscription fee, annual subscription fee, and the like can be concluded for each device. The package can also be used by concluding a user license contract. In the device license contract, the number of device licenses is set, and in the user license contract, the number of user licenses is set. In the user license contract, the number of devices is not limited, but the license can be used only on the registered device. When using the paid package, the customer can conclude the device license contract or the user license contract considering the subscription fee. A customer is a target for which the license contract is to be concluded. The customer may be an individual user or an organization such as a company in which the package is used by a plurality of users.

When using the package, the user inputs user information registered at the time of concluding the contract into the image forming apparatus 10, designates the application, and requests execution. The image forming apparatus 10 transmits the input user information to the information processing apparatus 11 and requests an authentication process. The user information is a user identifier (ID), a password, or the like required for authentication. Here, the user information is input by the user, but the present disclosure is not limited to this method, and the user information registered in the integrated circuit (IC) card or the like may be read by a reading device, or biometric information may be used instead of the user ID and password.

When a license contract is concluded with the user, the information processing apparatus 11 receives and registers the user information. The information processing apparatus 11 compares the user information received and transmitted by the image forming apparatus 10 with the registered user information, and when the user information match, determines that the authentication is successful, and the use of the application is permitted. On the other hand, when the user information does not match, the information processing apparatus 11 determines that the authentication is not successful, and the use of the application is refused.

The service providing system is not limited to a system including one or more image forming apparatuses 10 and one information processing apparatus 11. The function of the information processing apparatus 11 may be implemented on one or more image forming apparatuses 10 or may include only one or more image forming apparatuses 10. In the service providing system, the information processing apparatus 11 may receive an execution request of the application directly from the user and executes the processing of the application. Further, the service providing system may be implemented by only the information processing apparatus 11. The information processing apparatus 11 is not limited to one, and the service providing system may include a plurality of information processing apparatuses 11.

Figure 2:
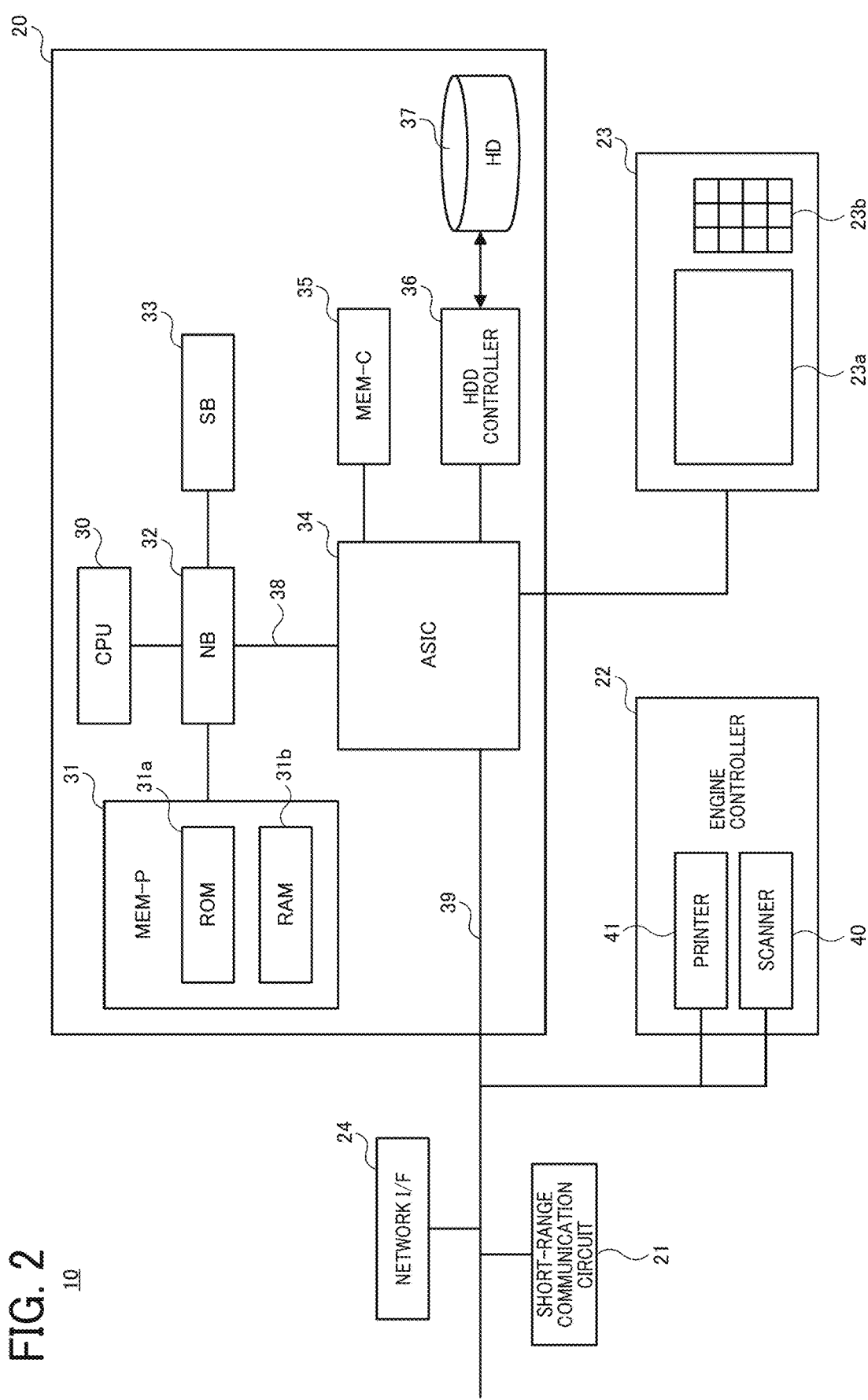
FIG. 2 is a block diagram illustrating an example of a hardware configuration of an image forming apparatus.

FIG. 2 is a block diagram illustrating an example of a hardware configuration of an image forming apparatus 10 included in the service providing system. In the following, a description is given of an MFP as an example of the image forming apparatus 10. The MFP includes a controller 20, a short-range communication circuit 21, an engine controller 22, a control panel 23, and a network interface (I/F) 24.

The controller 20 includes a central processing unit (CPU) 30 as a main processor, a system memory (MEM-P) 31, a northbridge (NB) 32, a southbridge (SB) 33, an application-specific integrated circuit (ASIC) 34, a local memory (MEM-C) 35, a hard disk drive (HDD) controller 36, and a hard disk (HD) 37. The NB 32 and the ASIC 34 are connected to each other by an Accelerated Graphics Port (AGP) bus 38.

The CPU 30 is a control unit that controls the entire MFP. The NB 32 is a bridge for connecting the CPU 30, the MEM-P 31, the SB 33, and the AGP bus 38, and includes a memory controller that controls reading and writing to the MEM-P 31, a Peripheral Component Interconnect (PCI) master, and an AGP target.

The MEM-P 31 includes a read only memory (ROM) 31*a* as a memory that stores program and data for implementing various functions of the controller 20. The MEM-P 31 further includes a random access memory (RAM) 3 lb as a memory that deploys the program and data, or as a drawing memory that stores drawing data for printing. The program stored in the ROM 31*a* may be stored in any computer-readable storage medium, such as a compact disc-read only memory (CD-ROM), compact disc-recordable (CD-R), or digital versatile disc (DVD), in a file format installable or executable by the computer, for distribution.

The SB 33 is a bridge for connecting the NB 32 to PCI devices and peripheral devices. The ASIC 34 is an integrated circuit (IC) dedicated to an image processing use, and connects the AGP bus 38, a PCI bus 39, the HDD controller 36, and the MEM-C 35. The ASIC 34 is a PCI target and an AGP master, an arbiter (ARB) which is the core of the ASIC 34, a memory controller which controls the MEM-C 35 and includes a plurality of Direct Memory Access Controllers (DMACs) which rotate image data by hardware logic and the like. Further, the ASIC 34 includes a PCI unit that transfers data between the scanner 40 and the printer 41 through the PCI bus 39. The ASIC 34 may be connected to a Universal Serial Bus (USB) interface, or an Institute of Electrical and Electronics Engineers 1394 (IEEE1394) interface.

The MEM-C 35 is a local memory used as a copy image buffer and a code buffer. The HD 37 is a storage for storing image data, font data used during printing, and forms. The HDD controller 36 controls reading or writing of data to the HD 37 according to the control of the CPU 30. The AGP bus 38 is a bus interface for a graphic accelerator card suggested for speeding up graphic processing, and the graphic accelerator card can be speeded up by directly accessing the MEM-P 31 with high throughput.

The short-range communication circuit 21 is a communication circuit using Near Field Communication (NFC), BLUETOOTH (registered trademark), or the like.

The engine controller 22 includes the scanner 40 and the printer 41. The control panel 23 includes a display panel 23*a* such as a touch panel that displays the current setting value, selection screen, and the like and receives input from the user. Also, the control panel 23 is provided with an operation panel 23*b* including a numeric keypad for receiving set values of conditions related to image formation such as density setting conditions and a start key for receiving copy start instructions.

The controller 20 controls, for example, rendering, communication, input from the control panel 23, and the like. The scanner 40 or the printer 41 includes an image processing function such as error diffusion and gamma conversion.

The MFP can sequentially switch and select a document box function, a copy function, a printer function, and a facsimile function by using an application switching key on the control panel 23. When each function is selected, each mode is set.

The network I/F 24 is an interface for performing data communication using the network 12. The short-range communication circuit 21 and the network I/F 24 are electrically connected to the ASIC 34 through the PCI bus 39.

Figure 3:
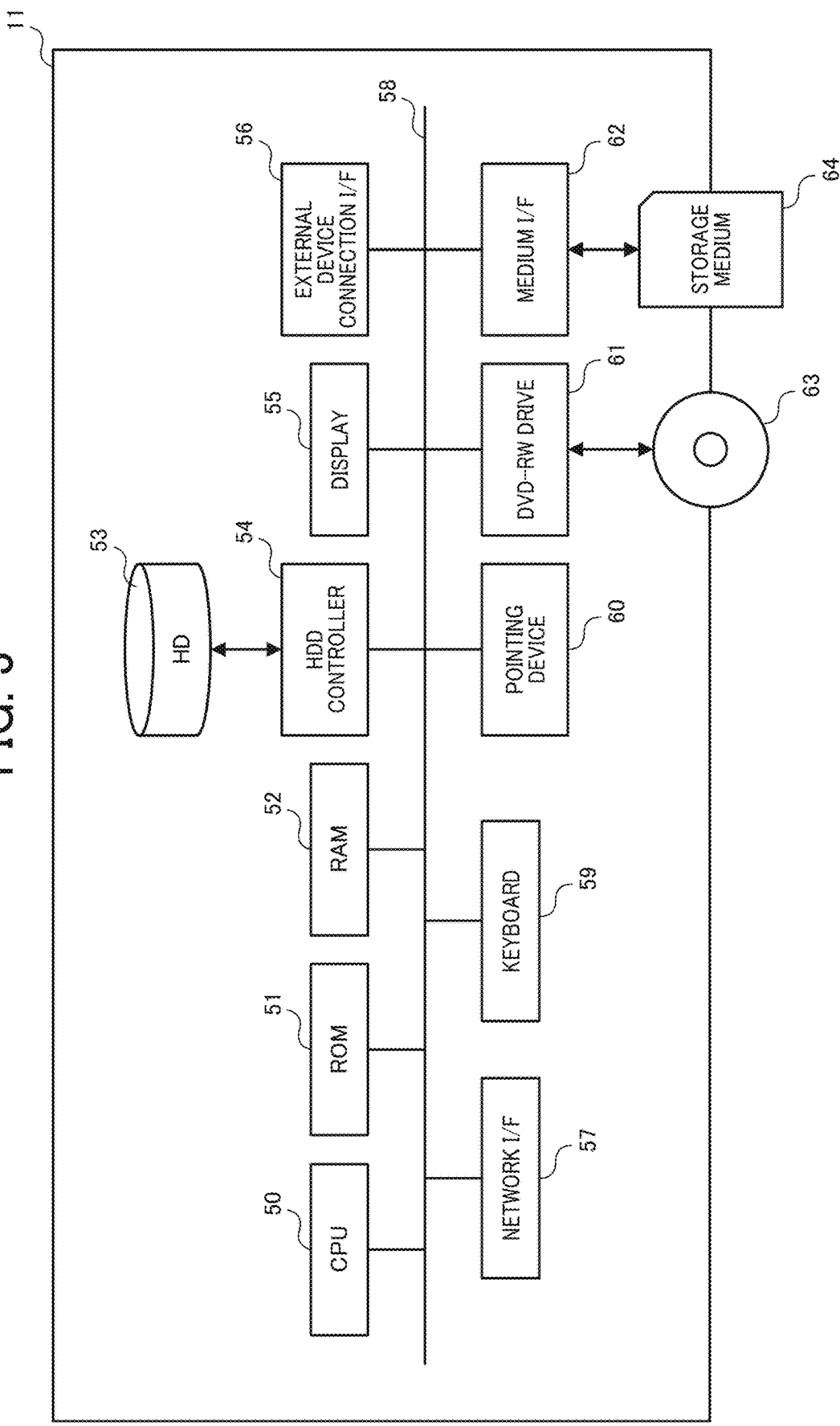
FIG. 3 is a block diagram illustrating an example of a hardware configuration of an information processing apparatus.

FIG. 3 is a block diagram illustrating an example of a hardware configuration of the information processing apparatus 11. The information processing apparatus 11 is a general computer, and includes a CPU 50, a ROM 51, a RAM 52, a hard disk (HD) 53, a hard disk drive (HDD) controller 54, a display 55, an external device connection I/F 56, a network I/F 57, a data bus 58, a keyboard 59, a pointing device 60, a Digital Versatile Disk Rewritable (DVD-RW) drive 61, and a medium I/F 62.

The CPU 50 controls overall operation of the information processing apparatus 11. The ROM 51 stores programs such as an initial program loader (IPL) to boot the CPU 50. The RAM 52 provides a work area for the CPU 50. The HD 53 stores various data such as programs. The HDD controller 54 controls reading or writing of various data to the HD 53 according to the control of the CPU 50. The display 55 displays various information such as a cursor, menu, window, characters, or image.

The external device connection I/F 56 is an interface for connecting various external devices. Examples of the external device include a USB memory and a printer. The network I/F 57 is an interface for communicating data using the network 12. The data bus 58 is an address bus, a data bus, or the like for electrically connecting each component such as the CPU 50.

The keyboard 59 is one example of an input device provided with a plurality of keys for enabling a user to input characters, numerals, or various instructions. The pointing device 60 is an example of an input device that allows a user to select or execute a specific instruction, select a target for processing, or move a cursor being displayed. The DVD-RW drive 61 is an example of a removable recording medium, and controls reading or writing of various data to a DVD-RW 63. Although the DVD-RW 63 is taken as an example, the present disclosure is not limited to the DVD-RW, and a Digital Versatile Disk Recordable (DVD-R) or the like may be used. The medium I/F 62 controls reading or writing of data to a storage medium 64 such as a flash memory.

The information processing apparatus 11 can use the HD 53 as a database, but the database may be provided separately from the information processing apparatus 11.

Figure 4:
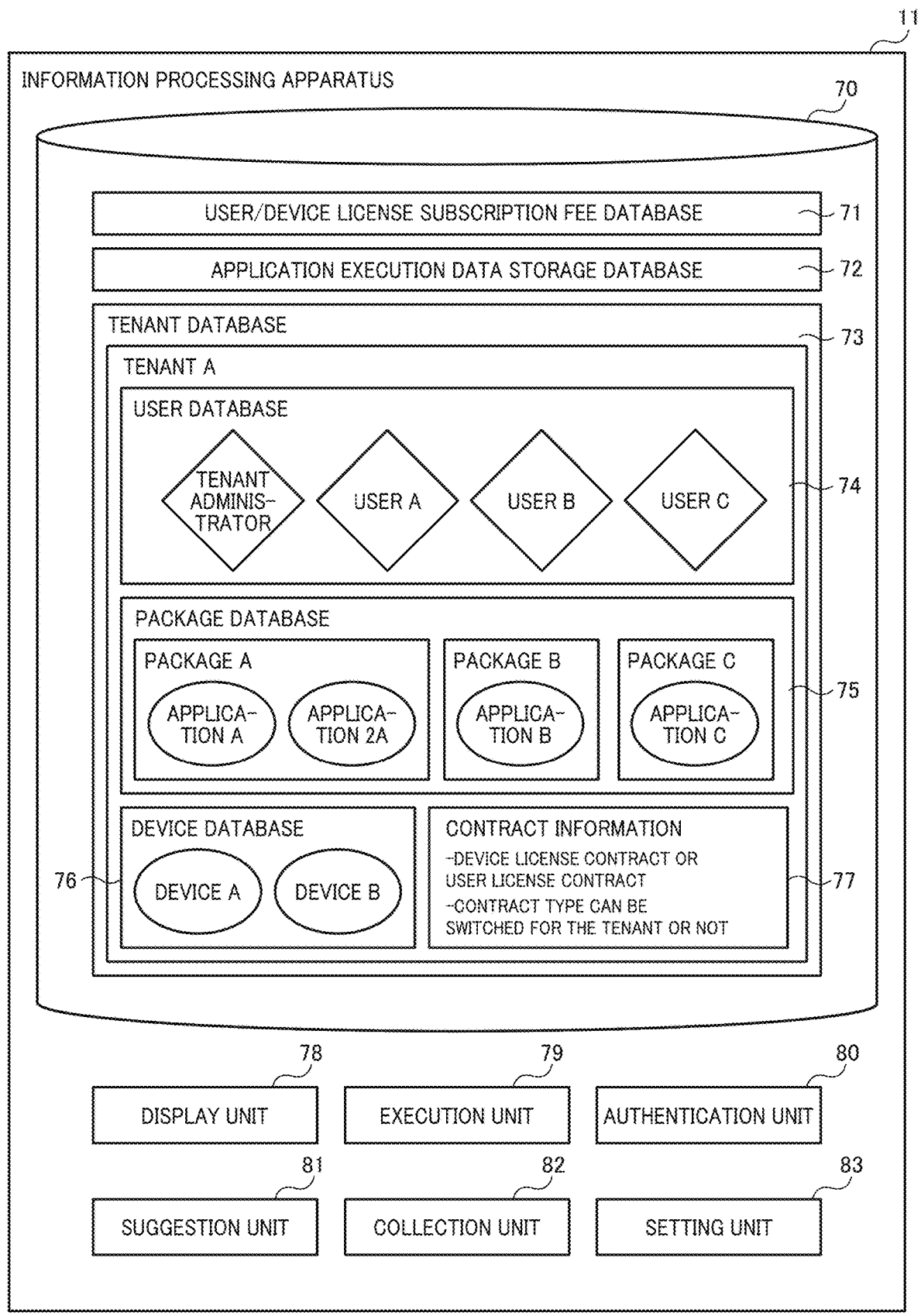
FIG. 4 is a diagram illustrating an example of a functional configuration of the information processing apparatus.

FIG. 4 is a block diagram illustrating an example of a functional configuration of the information processing apparatus 11. Each function included in the information processing apparatus 11 is implemented by a processing circuit such as the CPU 50.

The information processing apparatus 11 includes a user/device license subscription fee database 71, an application execution data storage database 72, and a tenant database 73 as a database 70.

The user/device license subscription fee database 71 stores subscription fee information for both the user license contract and the device license contract. The application execution data storage database 72 stores information such as time when the application is executed. The tenant database 73 stores information on a plurality of tenants. In the example illustrated in FIG. 4, only tenant A is illustrated, but information on other tenants such as tenant B may be included.

The tenant database 73 includes a user database 74 that stores information on users belonging to the tenant, a package database 75 that stores package information, and a device database 76 that stores device information.

The user information includes tenant administrator information and general user information. The package information is related to each package that is a sales unit of the application and includes information on the application registered in the package. The device information includes individual information (device ID, etc.) of the image forming apparatus 10 (an example of registered device) in which the application can be used.

The contract information 77 includes information indicating whether, for each tenant, the tenant has a device license contract or a user license contract, and information indicating whether the license contract can be switched, for example, between the device license contract and the user license contract. The contract information 77 is registered at the time of concluding the license contract and is updated when the license contract is renewed.

The information processing apparatus 11 includes a display unit 78, an execution unit 79, an authentication unit 80, a suggestion unit 81, a collection unit 82, and a setting unit 83.

The display unit 78 displays the license contract suggested to the administrator on a web site published on the web. The display time of the suggested license contract may be set by the general user or by the administrator. A calculation result calculated by the suggestion unit 81 may be displayed.

The suggestion unit 81 refers to the database, compares subscription fee contracted by the user with the calculated subscription fee, generates a suggestion for an inexpensive license contract, and transmits the suggestion to the display unit 78 for display. The calculation and the generation of the suggestion executed by the suggestion unit 81 may be executed at any time before transmission to the display unit 78.

The authentication unit 80 acquires information on the user who executed the application from the image forming apparatus 10. The user information can be acquired from the information (login information) that the user has input to the image forming apparatus 10 as authentication information.

The setting unit 83 manages the settings at the time of executing the application. As an example of the settings, a storage location when uploading a file, such as which directory in the cloud storage to save the file can be given. The present disclosure is not limited to this example and setting of the uniform resource locator (URL) of the distribution destination when data is distributed may be given as another example.

The execution unit 79 communicates with the image forming apparatus 10 and executes a processing of the application requested from the image forming apparatus 10. Example of the processing includes uploading a document file to a cloud storage. In the upload process, the document file is saved in the storage location set by the setting unit 83.

The collection unit 82 collects the execution contents of the application executed by the execution unit 79 as data and stores the execution contents of the application in the application execution data storage database 72 that functions as the storage.

The suggestion unit 81 calculates the usage count of the application based on the information stored in the application execution data storage database 72. The suggestion unit 81 determines a change of the license contract based on the usage count and suggests the change of the license contract.

The information processing apparatus 11 receives an application execution request from the image forming apparatus 10, executes the application, accumulates data when the application is executed, and suggests the change in the license contract based on the accumulated data. As described above, the information processing apparatus 11 executes a data storage process at the time of executing the application and a license contract suggestion process. Hereinafter, the details of the two processes described above are described in order.

Figure 5:
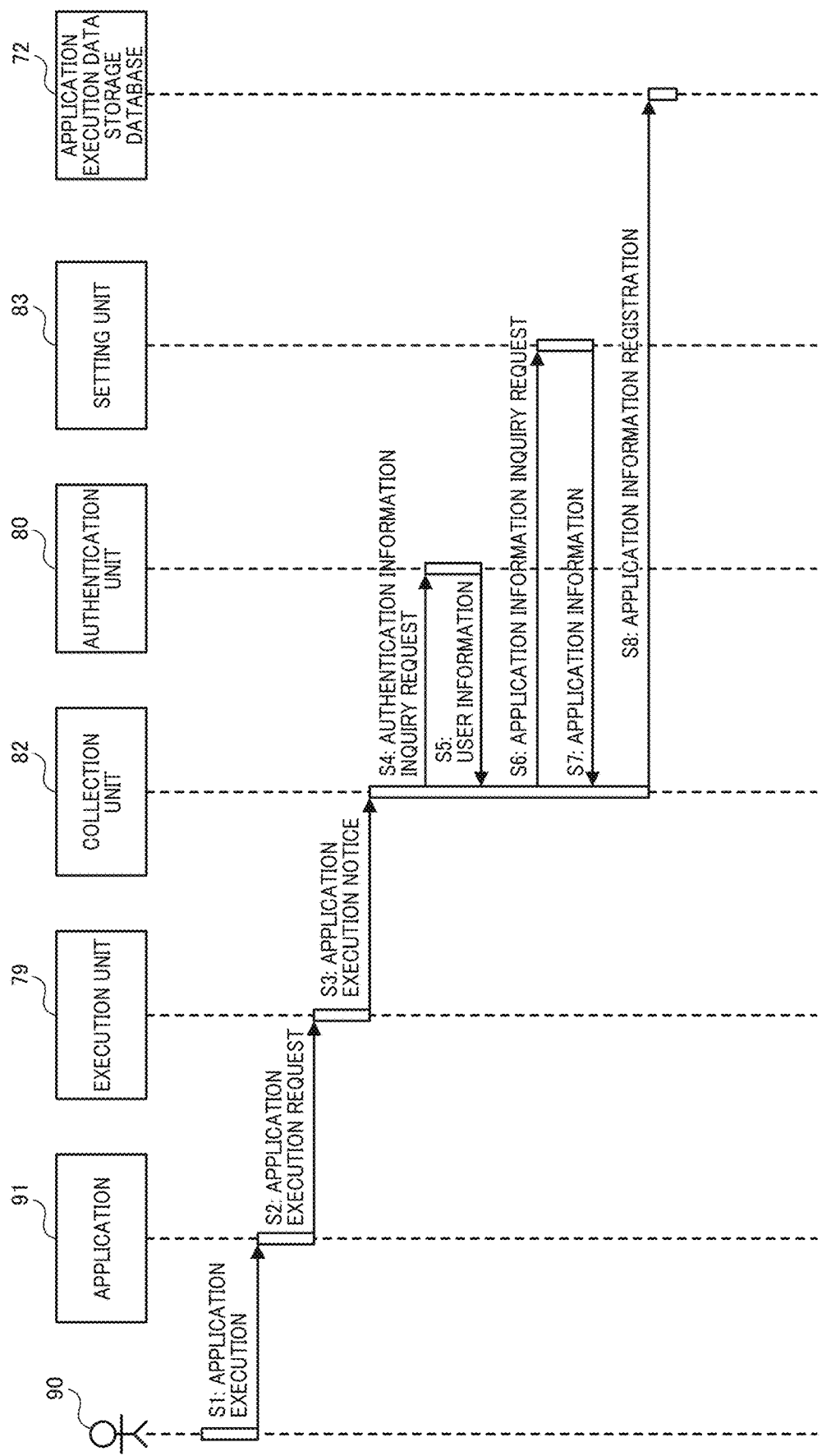
FIG. 5 is a sequence diagram illustrating an example of a data storage process.

The data storage process when the application is executed is described in the following. FIG. 5 is a sequence diagram illustrating an example of the data storage process. In step S1, the user 90 requests to execute an application 91, and in step S2, the application 91 transmits an execution request to the execution unit 79. In response to the execution request from the user 90 to upload a document file to the cloud storage, the application 91 requests the execution unit 79 to execute the process. In step S3, at the time of executing the requested process, the execution unit 79 notifies the collection unit 82 that the execution request has been received, execution time of the application 91, an application ID for identifying the application 91, and the authentication information.

In step S4, the collection unit 82 sends the authentication information to the authentication unit 80 and requests inquiry of the user information. In step S5, the authentication unit 80 inquires the user that executed the application 91 from the authentication information received from the collection unit 82 and transmits the user information to the collection unit 82. In step S6, the collection unit 82 sends the application ID to the setting unit 83 and requests an inquiry of the application information. In step S7, the setting unit 83 inquires which application has been executed from the application ID received from the collection unit 82 and transmits the application information to the collection unit 82.

In step S8, the collection unit 82 transmits and stores the user information and the application information collected from the authentication unit 80 and the setting unit 83 to the application execution data storage database 72.

FIG. 6 is a diagram illustrating an example of information stored in the application execution data storage database 72. In the application execution data storage database 72, execution date and time of the application 91, the application ID, an application type, the application ID of a compatible application, and the package ID are stored as the application information, and the user ID, a user role, an item indicating whether guest user or not (guest user), and the tenant ID are stored as the user information. These information are collected by the collection unit 82 and stored in the application execution data storage database 72.

The compatible application is a replaceable application including an application with additional feature. In the case of an application that cooperates with an external storage service, an application having additional functions such as receipt recognition and barcode reading can be mentioned as the compatible application. The application type indicates the type of application, and includes scanning, printing, scanning and printing, processing execution, device management, and the like.

The user role indicates a group of users, for example, a tenant administrator, the general user, and the like. The guest user is a user who does not belong to the tenant.

The license contract suggestion process is described in the following. The license contract includes the device license contract and the user license contract. In principle, license contract is a package-based contract, but an application-based contract is also included. The license contract suggestion process detects whether there are any unnecessary license that the customer is not using, deletes the detected unnecessary license, and suggests a license contract with lower subscription fee. The detection of unnecessary license is performed by using the calculated results based on the data stored in the database 70. The data stored in a set period (interval) is used for the calculation. The period can be entered and set in advance by the customer.

Figure 7:
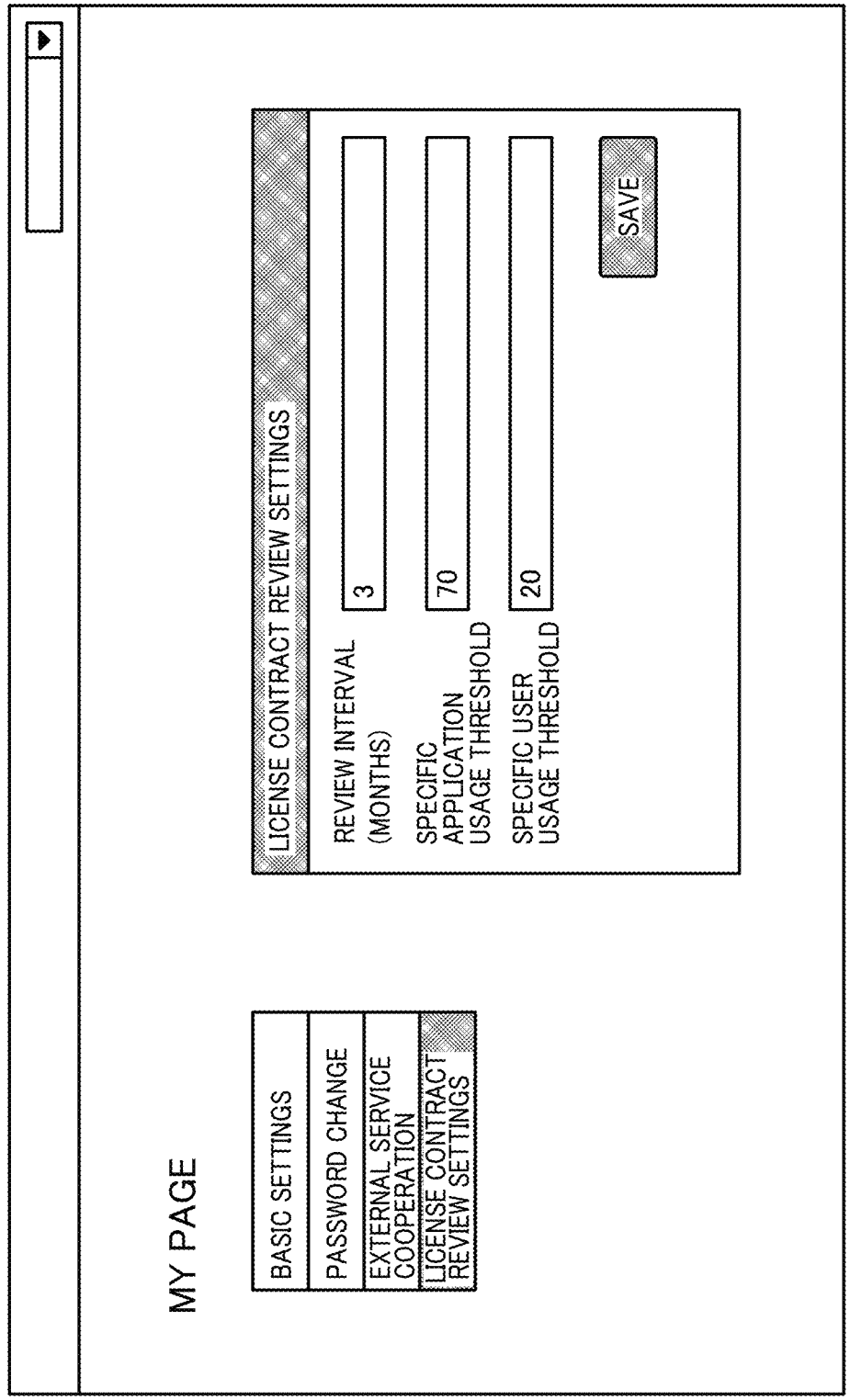
FIG. 7 is a diagram illustrating an example of a screen for setting interval of review and the like of a license contract.

FIG. 7 is a diagram illustrating an example of a screen for setting interval of suggestion and the like of the license contract. The screen illustrated in FIG. 7 includes a field for inputting the interval and a field for inputting threshold value for usage count. The interval is a frequency to suggest change in the license contract with reduced subscription fee.

The usage count includes the usage count of a specific application and the usage count of the specific application by a specific user. The usage count of the specific application is the number of times the specific application is used by all users who can use the specific application. The usage count of the specific application by a specific user is the number of times the specific user who can use the specific application used the specific application. The specific application usage threshold indicates a reference for determining whether the specific application is unnecessary, and when the usage count is equal to or less than the threshold value, the specific application can be regarded as an unnecessary application for all users. The specific user usage threshold indicates a reference for determining whether the specific application is unnecessary for the specific user, and when the usage count is equal to or less than the threshold value, the specific application can be regarded as an unnecessary application for the specific user.

FIG. 8 is a diagram illustrating an example of a user license subscription fee table stored in the user/device license subscription fee database 71. The user license subscription fee includes a subscription fee per user for each package, a number of contracted users, and a total subscription fee per package. The subscription fee per user may be a monthly fee, a 3-month, a 6-month fee, a yearly fee, or the like. The total subscription fee is calculated by multiplying the subscription fee per user by the number of contracted users. The user/device license subscription fee database 71 is referred to when acquiring the subscription fee for the user license contract.

FIG. 9 is a diagram illustrating an example of a device license subscription fee table stored in the user/device license subscription fee database 71. The device license subscription fee includes the subscription fee per device for each package, the number of contracted devices, and the total subscription fee per package. The subscription fee per device may be a monthly fee, a 3-month, a 6-month fee, a yearly fee, or the like. The total subscription fee is a subscription fee calculated by multiplying the subscription fee per device by the number of contracted devices. The user/device license subscription fee database 71 is referred to when acquiring the subscription fee of the device license contract.

Figure 10:
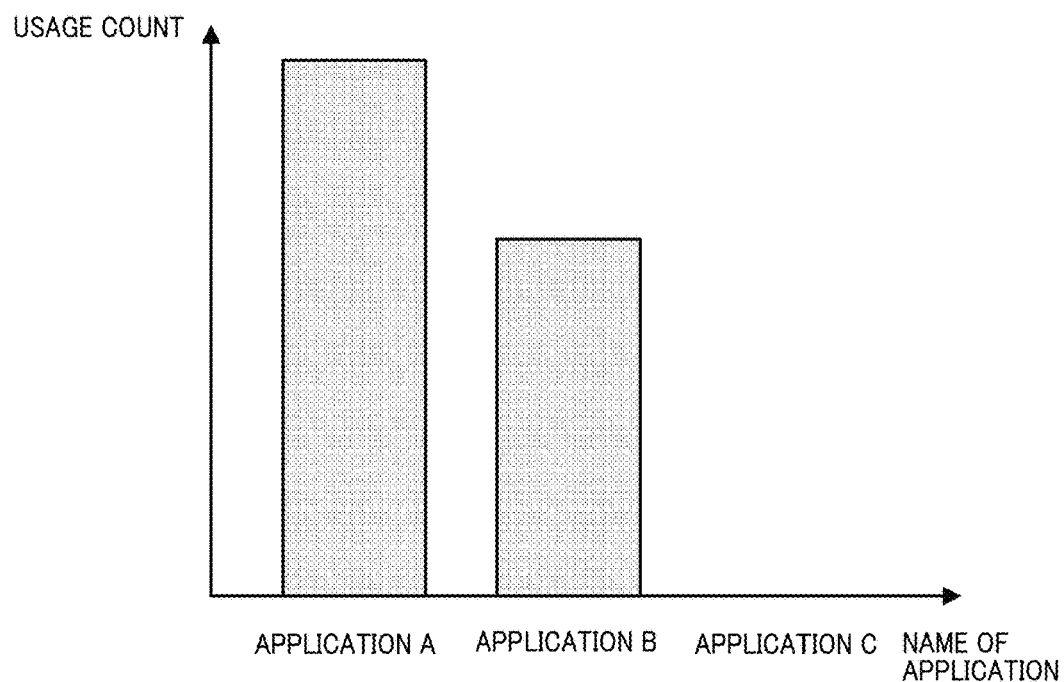
FIG. 10 is a graph illustrating an example of usage count for each application.

The usage count of each application is counted each time the application is executed during the set interval. FIG. 10 is a graph illustrating an example of usage count for each application. The three applications, application A, application B, and application C are included in a package. In the graph, the applications included in the package are indicated on a horizontal axis, and the usage count of each application is indicated on a vertical axis. In this example, application A and application B are used, but application C is not used.

In the example illustrated in FIG. 10, since the application C has not been used for a certain period of time, it is possible to suggest a license contract in which the application C is deleted to the customer.

Figure 11:
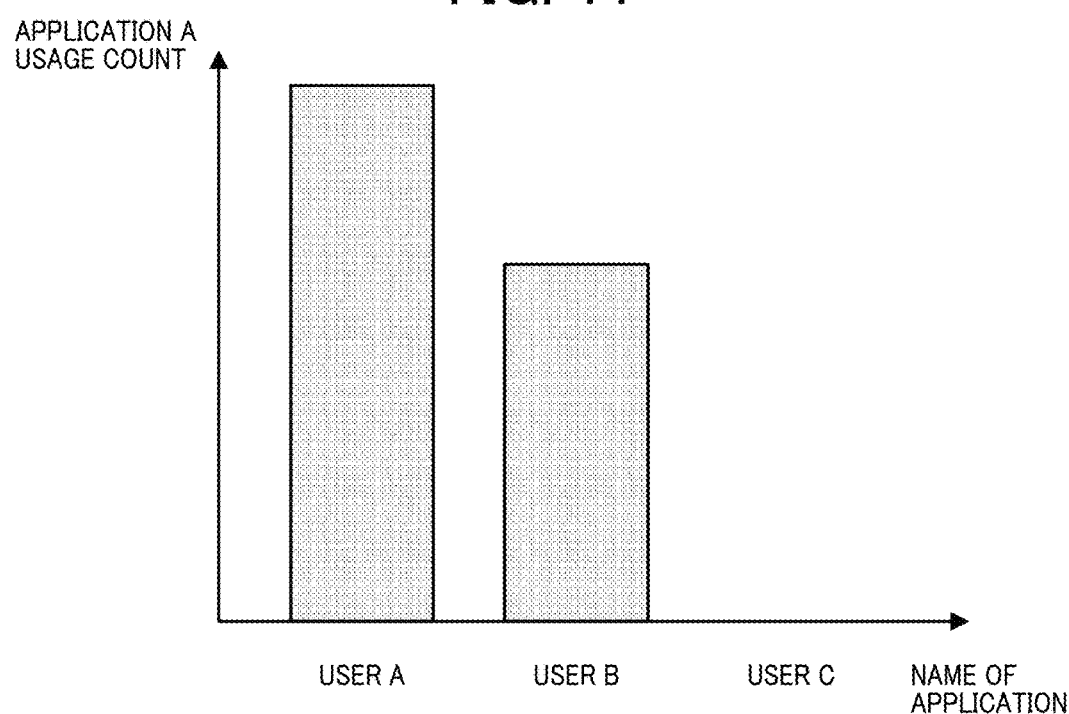
FIG. 11 is a diagram illustrating an example of the usage count of application A for each user.

The usage count for each application is counted for each user who can use each application. FIG. 11 is a graph illustrating an example of the usage count of the specific application (application A) for each user. Users who can use the application A include user A, user B, and user C. In the graph, the user who uses the application A is indicated on the horizontal axis, and the usage count of the application A is indicated on the vertical axis. In this example, the user A and user B are using the application A, but the user C is not using the application A.

In the example illustrated in FIG. 11, since the user C is not using the application A, it is possible to suggest the reduction of the user license for the application A to the customer.

FIG. 12 is a flowchart illustrating a process for suggesting the license contract with a reduced number of users. The process of suggesting the license contract is executed every time the interval set on the screen illustrated in FIG. 7 elapses. In step S100, the process starts by confirming a contract form of a particular tenant by referring to the contract information 77 of the tenant database 73. In this example, the contract form of the tenant is the user license contract.

In step S101, information related to the tenant subject for the process is extracted from the information stored in the application execution data storage database 72. Then, the usage count for each application is calculated for each user belonging to the tenant subject for the process. Whether there is a user whose usage count is equal to or less than the threshold value is determined for each application based on the calculation result. When it is determined that there is no such user, the process proceeds to step S106, and the process ends. This is because all users are using all applications in excess of the threshold value, and there is no need to reduce the number of licenses.

In step S101, when there is a user whose usage count is equal to or less than the threshold value, the process proceeds to step S102, and a user list is created excluding the user who is determined not using the application based on the usage count. Then, the subscription fee is calculated based on the license contract concluded with the created user list.

The process of determining that the application is unnecessary in step S102 is described in the following. Since the processing differs depending on whether the user license is associated with the tenant, the package, or the application, the processing in each case is described in order.

When the user license is associated with the tenant (when the number of licenses contracted by each tenant is fixed), the contract is set to use all the applications in the package with the same number of licenses as the number of users belonging to the tenant. Therefore, even if a specific user uses only a specific application of the package, the license is required for the specific user unless the usage count for the set interval is less than the threshold value. Therefore, whether the usage count of all applications is equal to or less than the threshold value is determined for each user, and the user with a usage count equal to or less than the threshold value is determined that the application is not necessary for that user. After making determination for all users, the subscription fee is calculated with the reduced number of users determined not requiring the application.

When the user license is associated with the package (when the number of licenses contracted for each package is set), the contract is set to use all the applications of the package with any number of users regardless of the number of users belonging to the tenant. A list of applications with the usage count equal to or less than the threshold for each user is created and based on the list, determination is made as to whether the usage count for all users is equal to or less than the threshold for each user. A license for a user whose usage count of all applications is less than the threshold value is determined to be unnecessary. After making determination for all users, the subscription fee is calculated with the reduced number of users determined not requiring the application.

A user is determined not requiring a license for a package, when all applications that the user is not using belong to the package, and when an application used more than the threshold value does not belong to the package.

When the user license is associated with the application, the license is determined not necessary for a user whose usage count is equal to or less than the threshold value for each application based on a list of applications whose usage count for each user is equal to or less than the threshold value and calculate the subscription fee when the number of users is reduced for each application.

It is not possible that the user license is associated with the tenant, and the package or the application at the same time. On the other hand, the user license may be associated with the package and the application at the same time because the sales in the package unit and the sales in the application unit may coexist.

In step S103, whether the device license contract can be switched with the reduced number of users is determined. Whether it is possible to switch to the device license contract is determined by referring to the contract information 77 of the tenant database 73. When it is determined that switching is possible, the process proceeds to step S104, and when it is determined that switching is not possible, the process proceeds to step S105.

In step S104, the subscription fee when switching to the device license contract is calculated. When it is possible to switch to the device license contract, the subscription fee is calculated for contracting one device. When the calculated subscription fee of the device license contract for one device is lower compared to the user license contract subscription fee with the reduced number of users, the number of devices is increased by one and the device license contract subscription fee is recalculated. This process is repeated until the calculated subscription fee is higher than the user license contract, and the maximum number of devices that can be contracted is the number of devices obtained by subtracting 1 from the number of devices when the calculated subscription fee is higher than the user license contract subscription fee.

The maximum number of devices that can be contracted can be calculated by a method using the data of the customer who has a device license contract. For example, a binary search can be performed using the number of devices of the customer who uses the most devices, and the maximum number of devices for which a device license contract can be made can be searched. When the maximum number of devices that can be contracted with the device license is 0, it is determined that it is better not to switch to the device license contract since reduction in the subscription fee cannot be expected.

In step S105, reduction in the subscription fee is calculated from the current contract and the subscription fee calculated in step S104 is displayed. Also, when switching to the device license contract is less expensive than the user license contract, that fact is displayed together with the amount of reduction in the subscription fee. The suggestion to change the license contract is made as described above.

When the current number of devices registered by the tenant is larger than the maximum number of devices that can be contracted with the device license, a warning can be issued at the time of suggestion. In this case, it may be displayed that it is better not to switch to the device license contract since switching to the device license contract increases the subscription fee. If the maximum number of devices that can be contracted for the device license is larger, the subscription fee is calculated based on the number of devices currently registered by the tenant. In the suggestion, both the subscription fee for contracting with the maximum number of devices and the calculated subscription fee for the current number of devices registered by the tenant may be presented, or only one of the subscription fees may be presented.

The suggestion may be displayed to the administrator on the web site or may be displayed when the administrator logs in to the control panel 23 of the image forming apparatus 10.

Figure 13A:
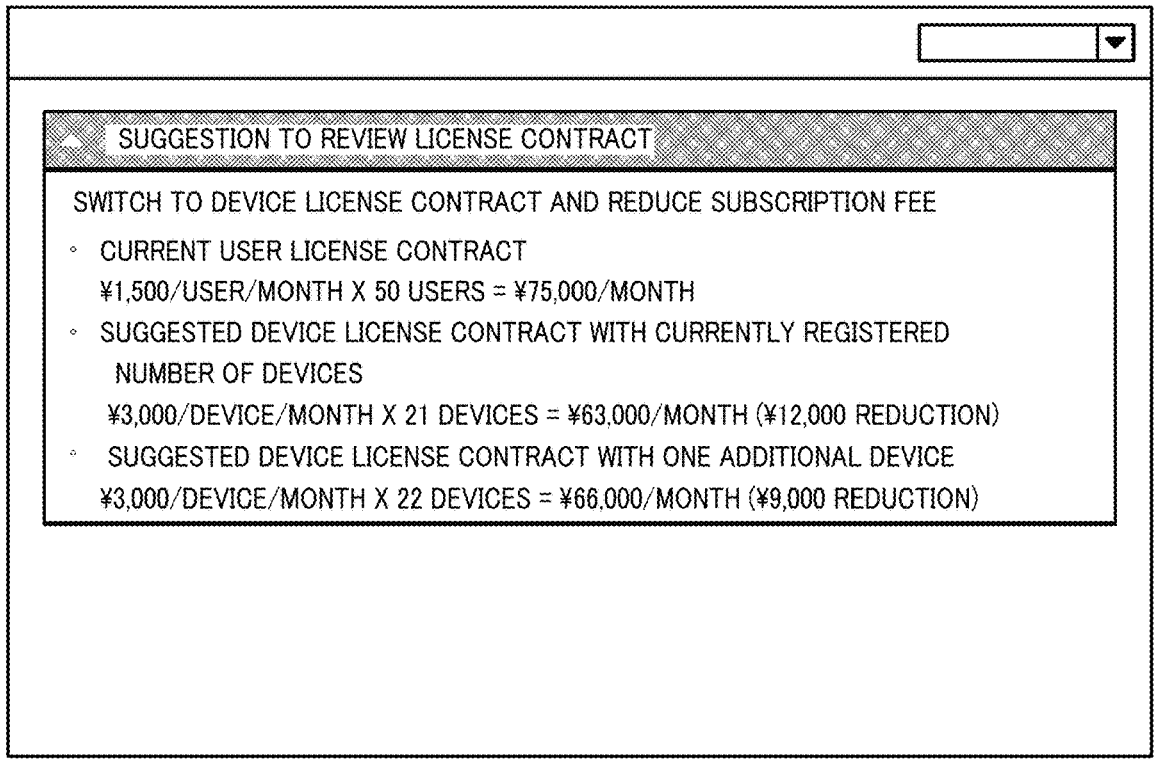
FIGS. 13A and 13B are diagrams illustrating examples of screens for suggesting switching to a device license contract.
Figure 13B:
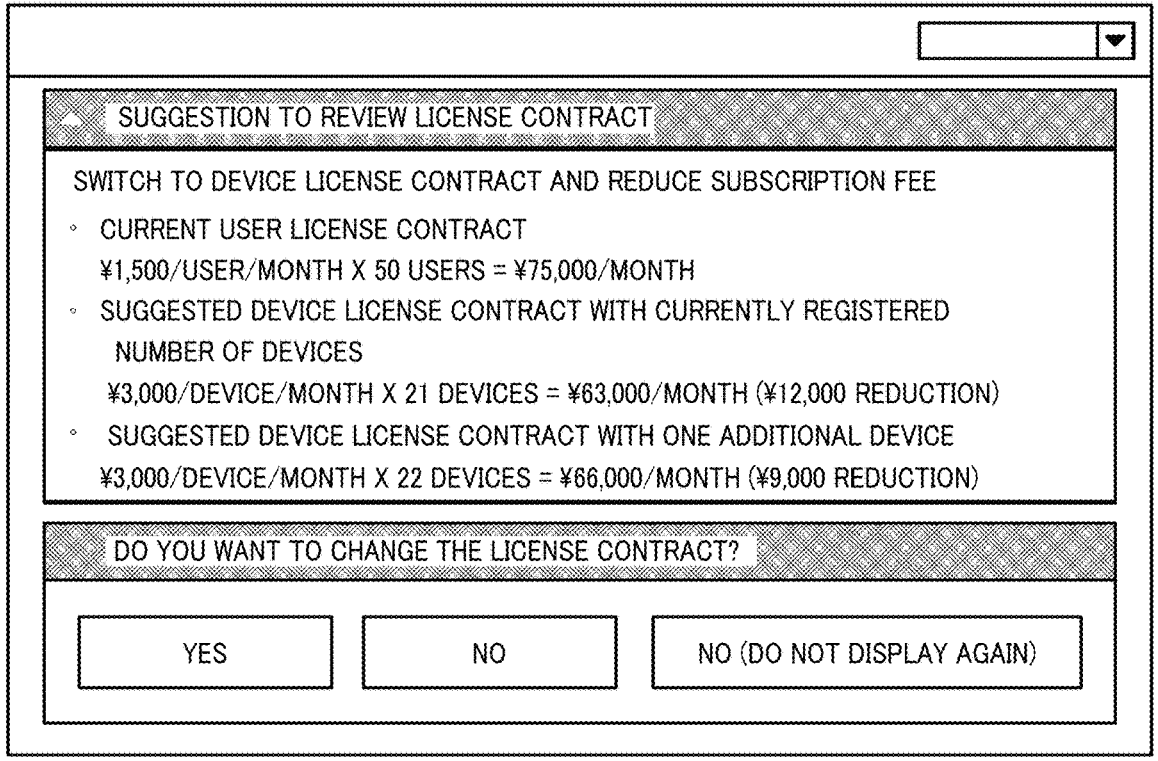

FIGS. 13A and 13B are diagrams illustrating examples of screens for suggesting switching to the device license contract. FIG. 13A is a diagram illustrating an example of a screen suggesting switching to the device license contract, and FIG. 13B is a diagram illustrating a modified example of the screen. The subscription fee of the device license contract with one device added to the current number of devices registered by the tenant is displayed on the screen illustrated in FIG. 13A. It also indicates the difference when switching to the device license contract with the number of devices currently registered by the tenant. From this suggestion, the customer can switch to the device license contract with an increased number of devices, or the device license contract without changing the number of devices.

The screen illustrated in FIG. 13B indicates that one device can be added to the number of devices currently registered by the tenant according to the calculation result, and the difference when switching to the device license contract maintaining the number of devices currently registered. In addition, a button for selecting whether to change the license contract is displayed, and by selecting the YES button, it is possible to switch to a web page for changing the license contract. On the other hand, the screen can be closed by selecting the NO button. The information processing apparatus 11 may include an input unit that receives the selection of whether to change to the license contract suggested by the suggestion unit 81. The display unit 78 switches the screen according to the selection received by the input unit. The display unit 78 switches the screen to the web page for changing the license contract in response to the selection to change the license contract.

On this screen, a button for hiding a display part for selecting whether to change the license contract is also displayed. By pressing this button, the screen presenting only the suggestion of switching the license contract as illustrated in FIG. 13A is displayed thereafter.

FIG. 14 is a flowchart illustrating a process for suggesting the license contract with a reduced number of applications. The process of suggesting the license contract is executed every time the interval set on the screen illustrated in FIG. 7 elapses. In step S200, the process starts by confirming a contract form of the tenant by referring to the contract information 77 of the tenant database 73. In this example, the contract form of the tenant is the user license contract.

In step S201, the information related to the tenant subject for the process is extracted from the information stored in the application execution data storage database 72. Then, it is determined whether there is an application registered in the tenant subject for current processing and usage count equal to or less than the threshold value. When there is no application with usage count equal to or less than the threshold value, the process proceeds to step S206, and the process ends. This is because all applications are used more than the threshold value, and there is no need to reduce the application on a package-by-package basis or on an application-by-application basis.

When there is an application whose usage count is equal to or less than the threshold value in step S201, the process proceeds to step S202. In step S202, the applications registered in the tenant with usage count equal to or less than the threshold value is determined unnecessary, and a list of applications excluding the unnecessary applications is created.

In step S203, whether there is an unnecessary application that can be reduced when the package is contracted by the tenant or when the package is contracted by the user is determined. When there is an unnecessary application, the process proceeds to step S204, and when not, the process proceeds to step S206 to end the process.

In step S204, when the calculation result in step S201 indicates that the applications can be reduced only in the unit of package, or when the calculation result in step S201 indicates that the applications can be reduced only in the unit of application, only one of the two processes can be executed. Whether the package or the application can be reduced in the unit of package or in the unit of application is stored in the contract information 77. When the applications can be reduced both in unit of package and in unit of application, both processes can be performed.

Since there are a case in which the package or the application is associated with the tenant and a case in which the package or the application is associated with the user, a process for each case is separately described below.

When the package is associated with the tenant and when the package can be reduced by unit of package, a list of applications for which the total usage count for each user belonging to the tenant is equal to or less than the threshold value is created. When the total usage count of all applications included in the package registered in the tenant is equal to or less than the threshold value, the package is determined not necessary. Then, the subscription fee for the license contract excluding the unnecessary package is calculated. This determination and calculation is performed for all users belonging to the tenant, and the total subscription fee is calculated.

When the package is associated with the user and when the package can be reduced by unit of package, a list of applications with usage count equal to or less than the threshold value for each user is created. When the usage count of all the applications in the package registered in the tenant is equal to or less than the threshold value, the package is determined not necessary. Then, the subscription fee for the license contract excluding the unnecessary package is calculated. The determination and calculation is done for all users belonging to the tenant and the total subscription fee is calculated.

When the application is associated with the tenant and when the package can be reduced by unit of package, a list of applications with usage count equal to or less than the threshold value for each user is created. An application with total usage count of each user belonging to the tenant is equal to or less than the threshold value is determined unnecessary. Then, the subscription fee for a license contract excluding the unnecessary application is calculated. The determination and calculation is done for all users belonging to the tenant and the total subscription fee is calculated.

When the application is associated with the user and the application can be reduced by unit of application, and when usage count for each user is equal to or less than the threshold value, the application is determined not necessary. Then, the subscription fee for a license contract excluding the unnecessary application is calculated. The determination and calculation is done for all users belonging to the tenant and the total subscription fee is calculated.

In step S205, reduced amount of subscription fee calculated from the current subscription fee and the subscription fee calculated in step S204 is displayed. The suggestion to change the license contract is made as described above.

The examples illustrated in FIGS. 12 to 14 describe the process of switching to the device license contract from the user license contract, the process of reducing the number of users, and the process of reducing packages and applications. Hereinafter, a process of switching to the user license contract from the device license contract, the process of reducing the number of users, and the process of reducing the number of packages and applications are described.

The process of reducing the number of users, the process of reducing the number of packages, and the process of reducing the number of applications are the same as the processes illustrated in steps S101, S102, and S105, in FIG. 12 and FIG. 14. The process of switching to the device license contract is described with reference to FIG. 15. In step S303 of FIG. 15, whether the contract can be switched to the device license contract with the reduced number of users is determined. Whether the contract can be switched to the user license contract is determined by referring to the contract information 77 of the tenant database 73. When it is determined that the switching is possible, the process proceeds to step S304, and when it is determined that switching is not possible, the process proceeds to step S305.

Figure 16A:
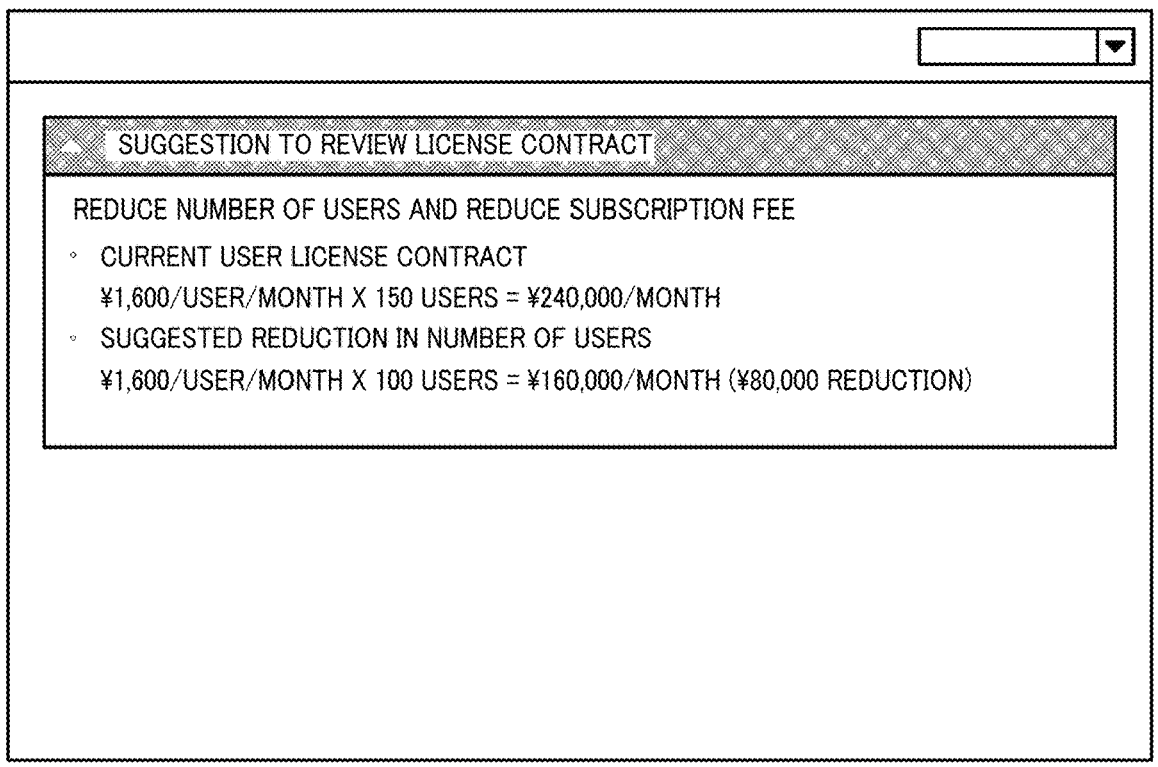
FIGS. 16A and 16B are diagrams illustrating examples of screens for suggesting a change in the license contract when a user license contract is associated with a tenant.
Figure 16B:
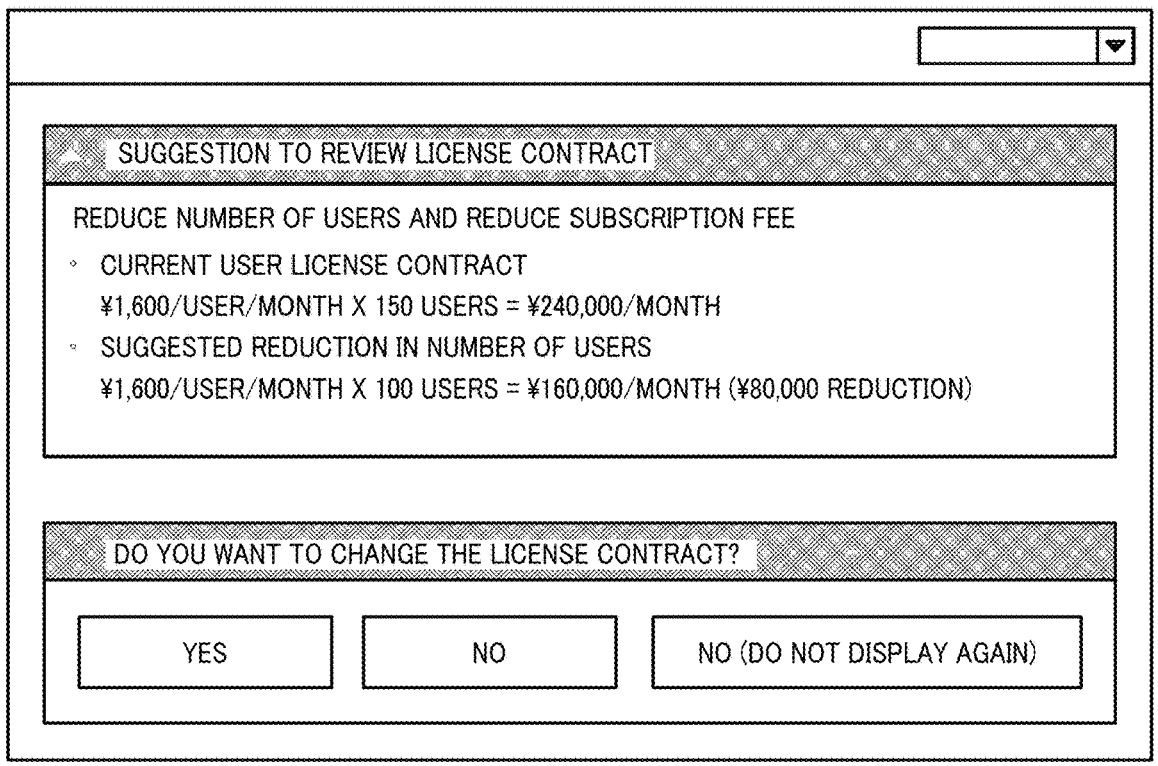

FIGS. 16A and 16B are diagrams illustrating an example of a screen for suggesting a change in the license contract when the user license contract is associated with the tenant. FIG. 16A is a diagram illustrating an example of a screen for suggesting a change in the license contract and FIG. 16B is a diagram illustrating a modified example of the screen. In the example illustrated in FIG. 16A, a suggestion to reduce the number of user licenses associated with the tenant from 150 to 100, and the difference in subscription fee between the current user license contract and the suggested user license contract with the reduced number of user licenses is displayed.

The screen illustrated in FIG. 16B also displays the difference in the subscription fee when the number of user licenses is reduced, and further, the buttons for selecting whether to change the user license contract is displayed. By selecting the YES button, the screen transitions to receive a change of the license contract, and by selecting the NO button, the screen is closed. Also, on this screen, the button to cancel the display for selecting whether to change the contract is displayed. By pressing this button, the screen to display just the suggestion of the new license contract as illustrated in FIG. 16A is displayed thereafter.

Figure 17A:
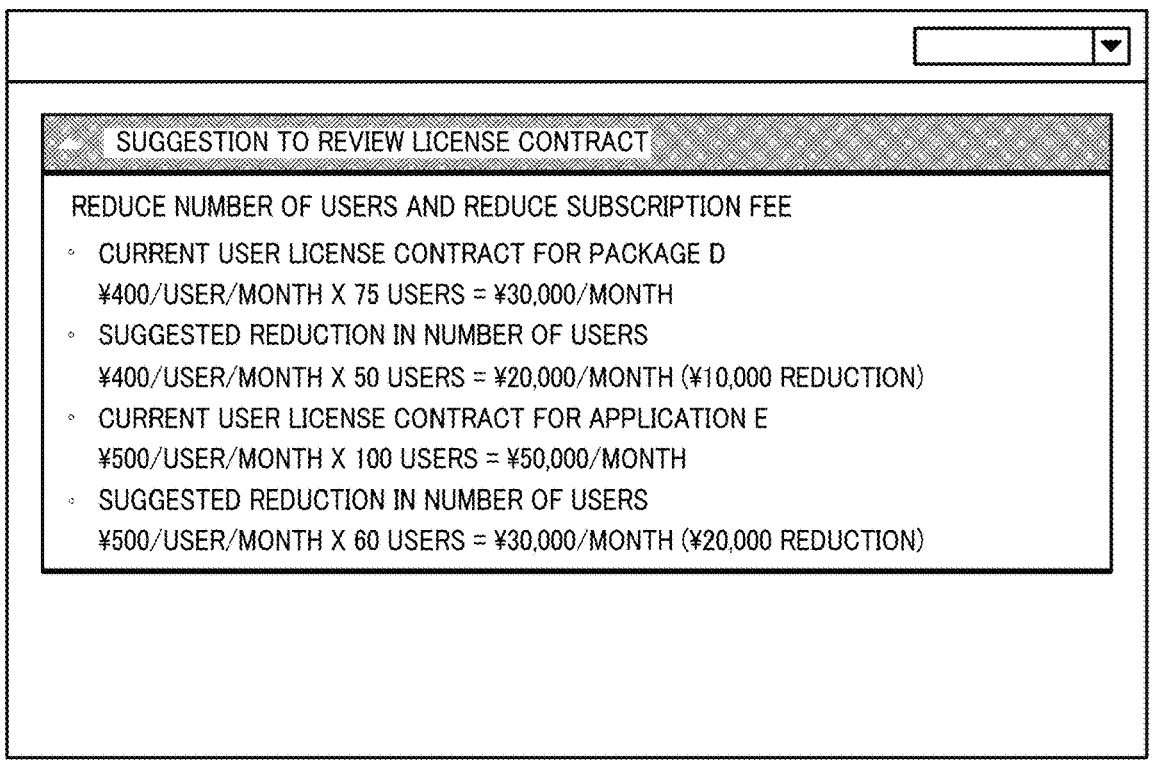
FIGS. 17A and 17B are diagrams illustrating examples of screens for suggesting a change in the license contract when the numbers of packages and applications can be reduced.
Figure 17B:
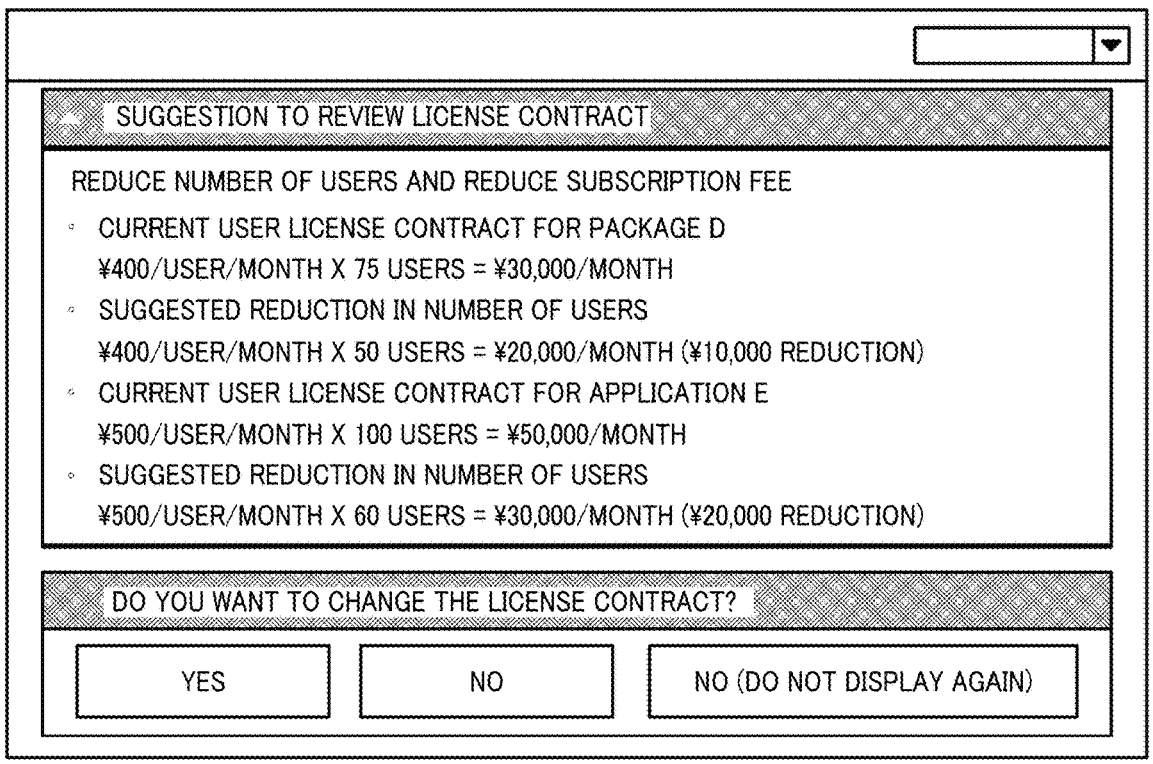

FIGS. 17A and 17B are diagrams illustrating examples of screens that suggest a change in license contract when the number of user licenses for the package and application can be reduced. FIG. 17A is a diagram illustrating an example of a screen for suggesting a change in the license contract, and FIG. 17B is a diagram illustrating a modified example of the screen. In the example illustrated in FIG. 17A, the package D and the application E are reduced, and the current user license subscription fees are reduced by 10,000 yen and 20,000 yen, respectively. The screen also displays the number of user licenses to be reduced.

The screen illustrated in FIG. 17B also displays the reduction in subscription fee when the number of user licenses for the package D and the application E are reduced, and the button for selecting whether to change the license contract is also included. By selecting the YES button, the screen transitions to receive a change of the license contract, and by selecting the NO button, the screen is closed. Also, on this screen, the button to cancel the display for selecting whether to change the contract is displayed. By pressing this button, the screen to display just the suggestion of the new contract as illustrated in FIG. 17A is displayed thereafter.

Figure 18:
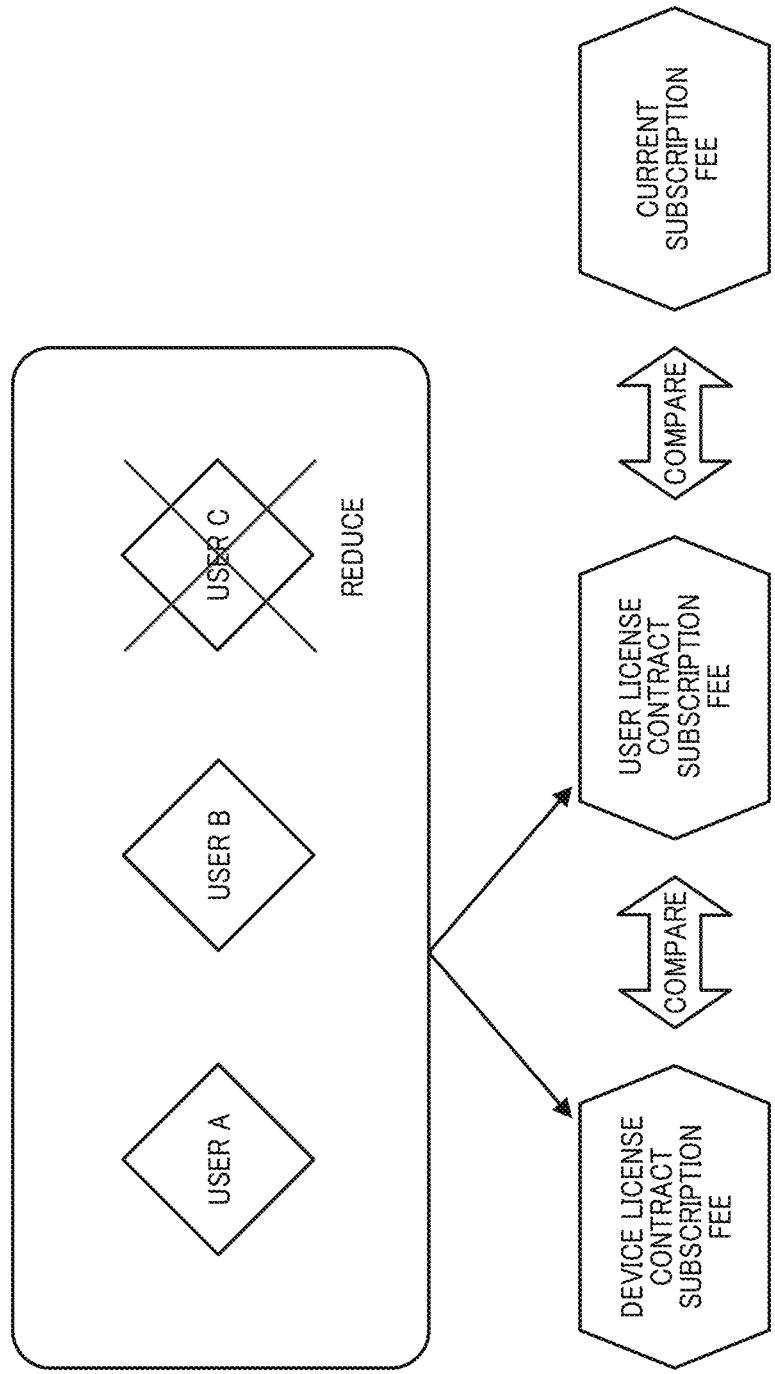
FIG. 18 is a diagram illustrating a comparison of the subscription fees.

FIG. 18 is a diagram illustrating a comparison of subscription fees executed by the suggestion unit 81. FIG. 18 illustrates a case of canceling the user license for user C included in the user license contract for users A, B, and C, since the usage count of user C is small in the execution of the process of suggesting the license contract.

The suggestion unit 81 performs a subscription fee calculation of the user license contract and a subscription fee calculation of the device license contract and compares each of the calculated subscription fees with the subscription fee of the current license contract. When the calculated subscription fee is lower than the current subscription fee, a new license contract is suggested to the customer. As a result, customer satisfaction can be improved.

Figure 19A:
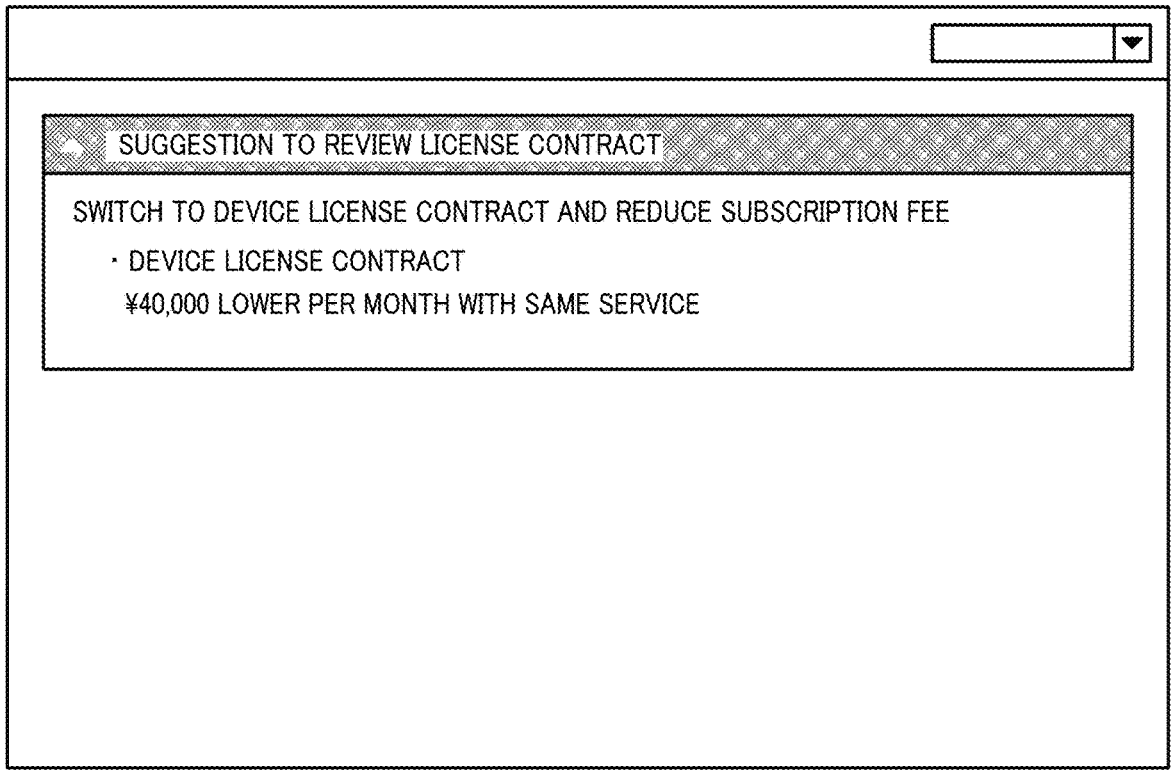
FIGS. 19A and 19B are diagrams illustrating examples of screens for suggesting the device license contract.
Figure 19B:
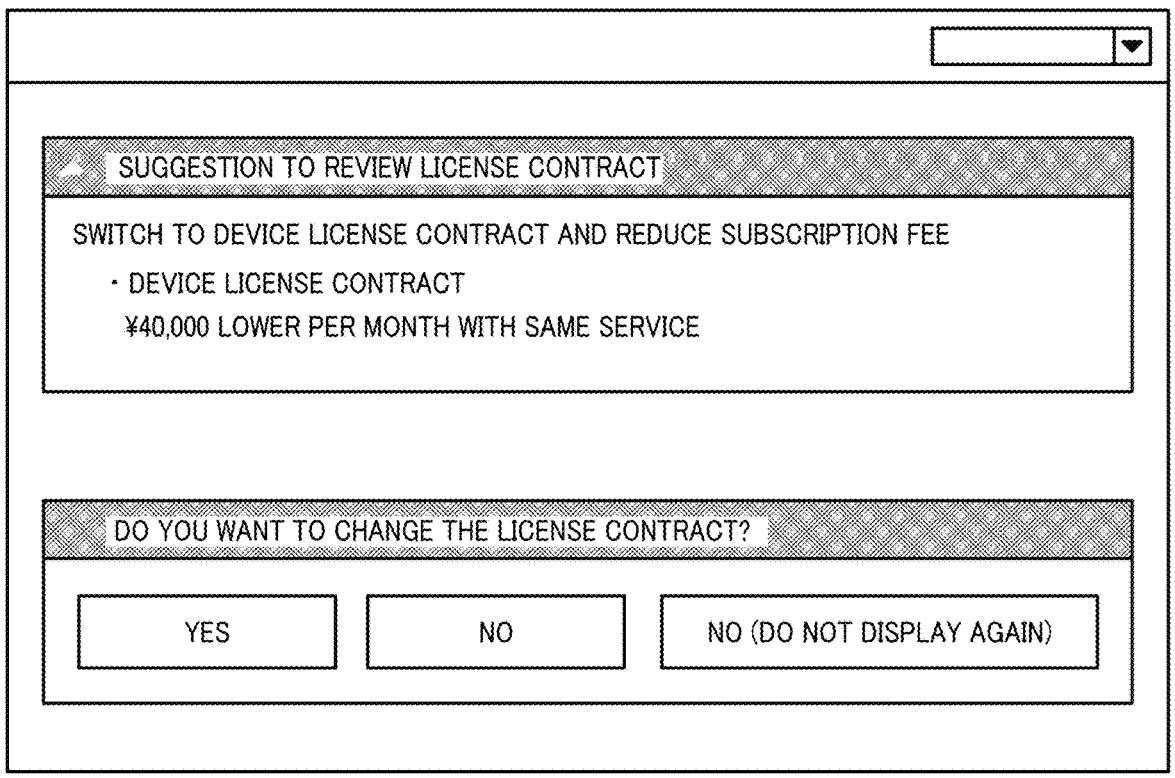

FIGS. 19A and 19B are diagrams illustrating examples of screens for suggesting the device license contract. FIG. 19A is a diagram illustrating an example of a screen for suggesting the device license contract, and FIG. 19B is a diagram illustrating a modified example of the screen. In the example illustrated in FIG. 19A, as a result of comparison, the subscription fee of the device license contract is 40,000 yen lower than the current user license contract. On the screen to suggest to the customer, switching to the device license contract is suggested, and the amount of reduction in the subscription fee is also displayed.

The screen illustrated in FIG. 19B also suggests the device license contract, and further displays the button for selecting whether to change the license contract. By selecting the YES button, the screen transitions to receive a change of the license contract, and by selecting the NO button, the screen is closed. Also, on this screen, the button to cancel the display for selecting whether to change the contract is displayed. By pressing this button, the screen to display just the suggestion of the new contract as illustrated in FIG. 19A is displayed thereafter.

Figure 20A:
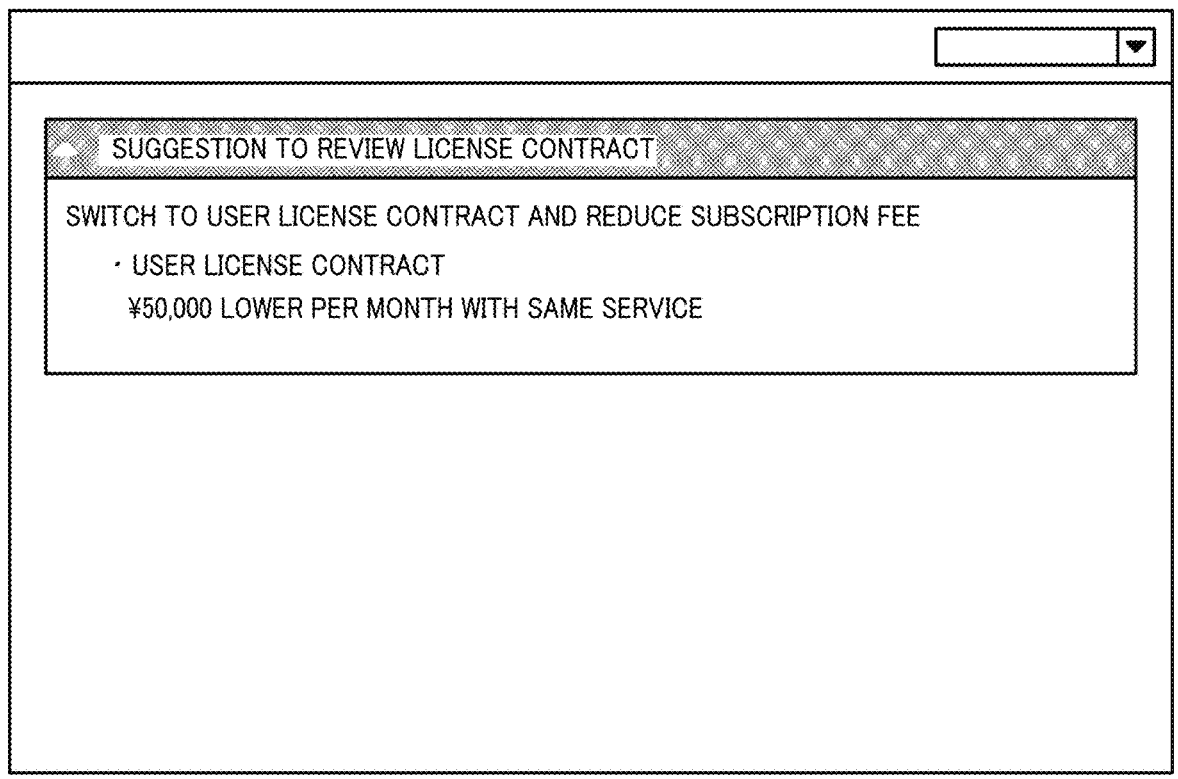
FIGS. 20A and 20B are diagrams illustrating examples of screens for suggesting the user license contract.
Figure 20B:
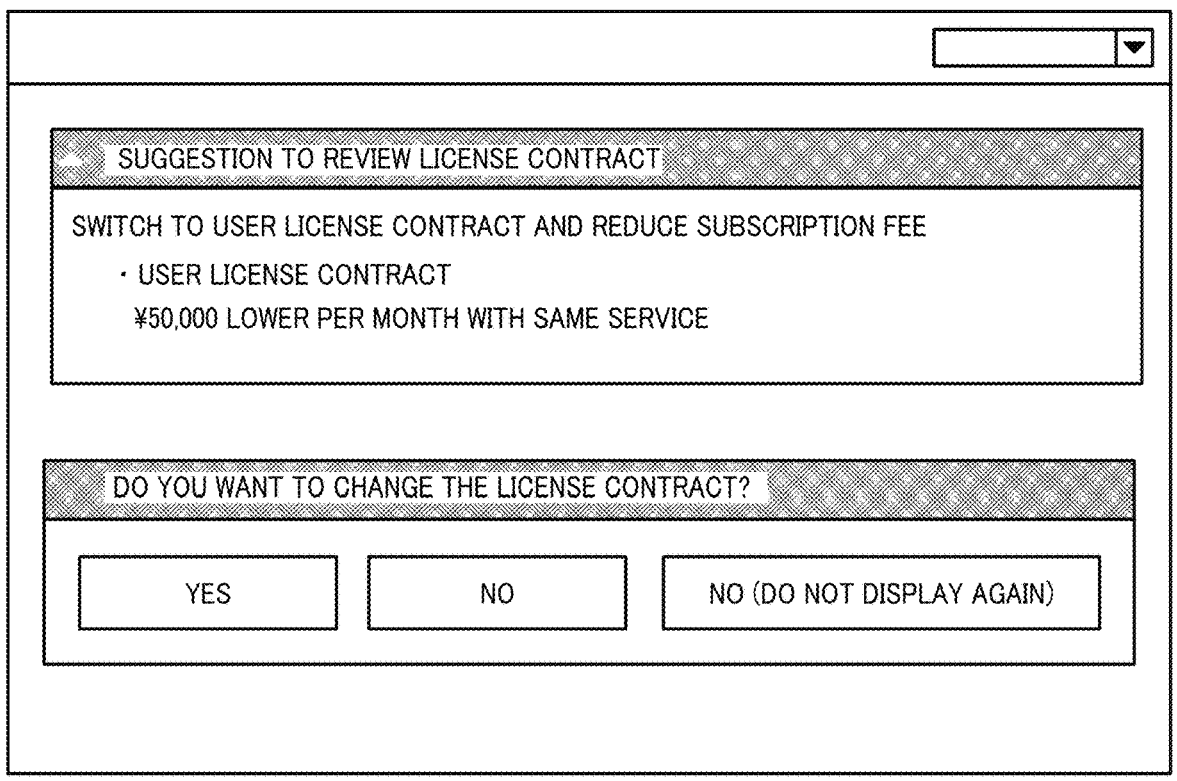

FIGS. 20A and 20B are diagrams illustrating examples of screens for suggesting the user license contract. FIG. 20A is a diagram illustrating an example of a screen for suggesting the user license contract, and FIG. 20B is a diagram illustrating a modified example of the screen. In the example illustrated in FIG. 20A, as a result of comparison, the subscription fee of the user license contract is 50,000 yen lower than the current device license contract. On the screen to suggest to the customer, switching to the user license contract is suggested, and the amount of reduction in the subscription fee is also displayed.

The screen illustrated in FIG. 20B also suggests the user license contract, and further displays the button for selecting whether to change the license contract. By selecting the YES button, the screen transitions to receive a change of the license contract, and by selecting the NO button, the screen is closed. Also, on this screen, the button to cancel the display for selecting whether to change the contract is displayed. By pressing this button, the screen to display just the suggestion of the new contract as illustrated in FIG. 20A is displayed thereafter.

The license contract with lower subscription fee includes fewer users, fewer packages, and fewer applications compared to the current license contract. When suggesting canceling a license for application, the customer may hesitate to cancel the license just by the information that the subscription fee will be lower because the customer may be concerned that operating effectiveness will be reduced. The customer's concern may be lessened by presenting a reason for cancelling the license. The reason for cancelling the license can be displayed together with the suggestion for the reduction of the license using the accumulated data.

An example of the reason to cancel the license is that a compatible application is being used. In addition to relatively simple applications that work with external storage services, there are applications with additional processing such as receipt recognition and barcode reading. The simple application and the application with additional processing can be considered as the compatible applications.

Initially, both the simple application and a forward compatible application with additional processing were contracted, but when referring to the actual usage, there are cases where only one of the simple application and the forward compatible application is being used. In such a case, using the compatible application can be the reason for cancelling the license for the application.

Another reason may be that a device management application is not being used. Applications are classified into various types according to the execution content. Types of applications include scan, print, scan and print, process execution, device management, and so on. Initially, a paid device management application was contracted, but when referring to the actual usage, the device management application does not seem to be used. In such a case, the reason for cancelling the license may be that the device management application is not being used.

Figure 21:
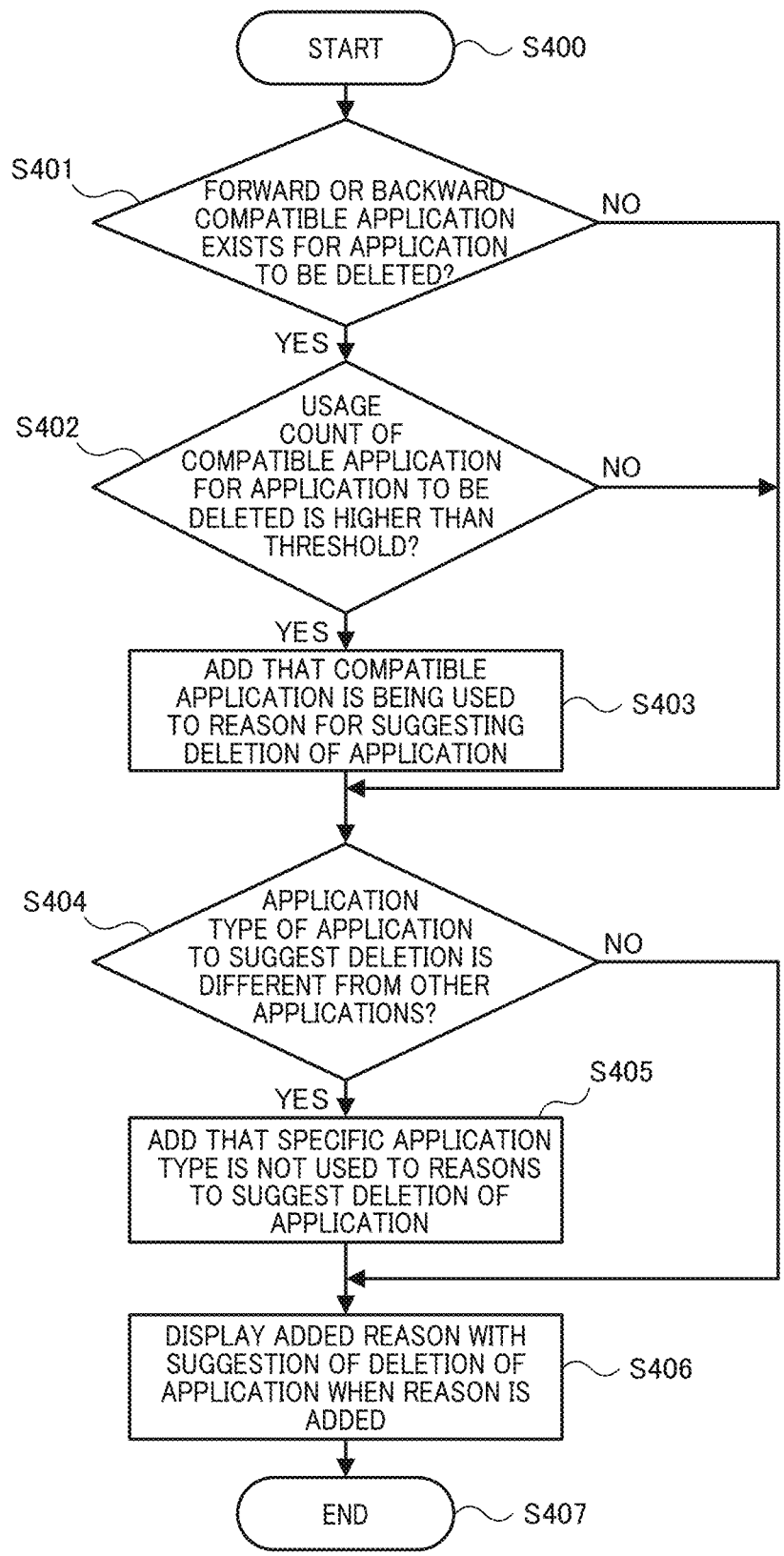
FIG. 21 is a flowchart illustrating an example of a process for preparing a reason for deleting the application.

FIG. 21 is a flowchart illustrating an example of a process for preparing a reason for cancelling the license. When the suggestion unit 81 makes the above comparison and suggests a change in the license contract including cancelling of the application, the process is started from step S400. When the subscription fee for cancelling the license for application is calculated, it can be determined that the suggestion includes cancelling of the license for application. Data stored in the database indicating whether the subscription fee has been calculated may be referenced, or variables in the program that indicate a calculation result may be referenced.

Note that this process does not have to be executed. When the process is not executed, the reason cannot be displayed along with the suggestion. As an example of not executing the process, the amount of information on the screen becomes too large and may cause difficulty in conveying the suggestion when the reason is displayed. When executing the process, the process can be executed between step S204 and step S205 in FIG. 14. The preparation process for the reason is executed by a separately provided preparation unit.

In step S401, whether there is the forward compatible or backward compatible application of the application to be deleted is determined. The determination is made based on an ID of the compatible application corresponding to the application ID of the application to be deleted from the information stored in the application execution data storage database 72 illustrated in FIG. 6. When the forward compatible or backward compatible application exists, the process proceeds to step S402, and if not, the process proceeds to step S404.

In step S402, whether the usage count of the forward compatible or backward compatible application of the application to be deleted is higher than the threshold value is determined. When the usage count of the forward compatible or backward compatible application of the application to be deleted is equal to or higher than the threshold value, the process proceeds to step S403 and add that the compatible application is being used as the reason for suggesting deleting the application. When the usage count is equal to or less than the threshold value in step S402, the process proceeds to step S404.

In step S404, whether the application type of the application to be deleted is different from the application types of other applications is determined. Specifically, the application type of the application to be deleted and the application type of the application that can be used by the tenant (application other than the application to be deleted) are compared. Only when the application type of the application to be deleted and the application type of all the other applications are different, it is determined that the application type of the application to be deleted is different from the application type of the other applications. When the application types are different, the process proceeds to step S405, and the application types are not different, the process proceeds to step S406.

In step S405, as the reason for suggesting the deletion of the application, a particular application type is not used is added. In step S406, the reason is displayed when suggesting the deletion of the application. Then, in step S407, the reason preparation process ends.

Figure 22A:
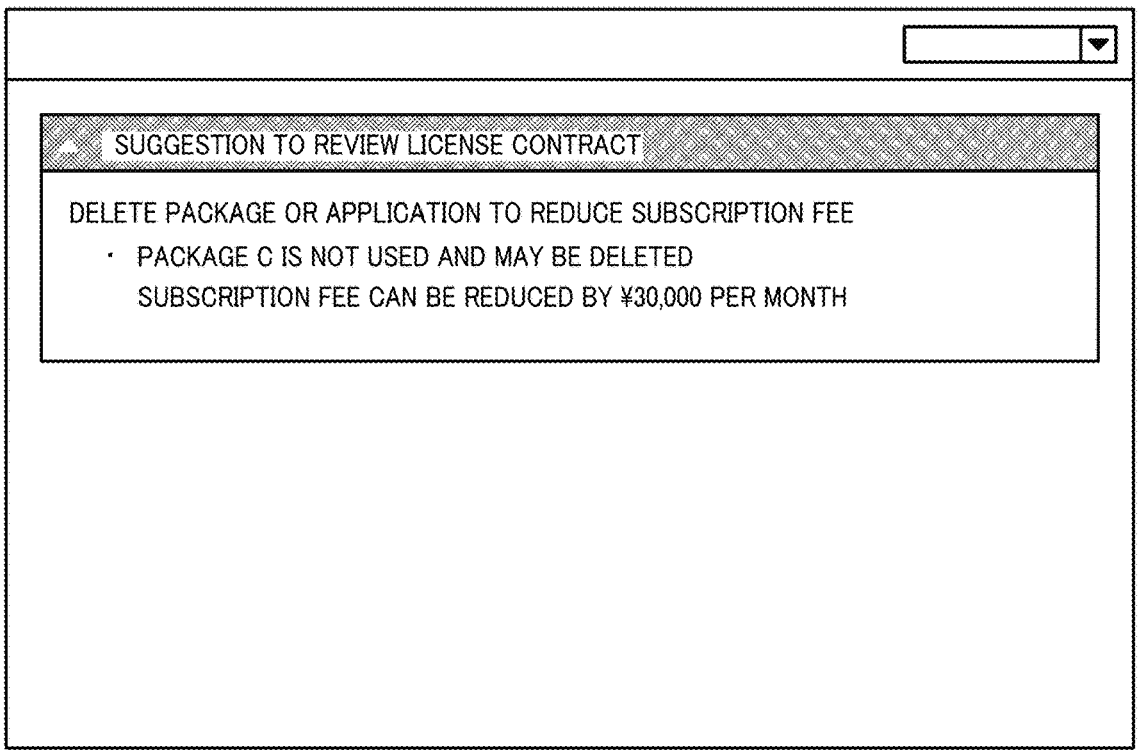
FIGS. 22A and 22B are diagrams illustrating examples of screens for suggesting deletion of the application without describing the reason.
Figure 22B:
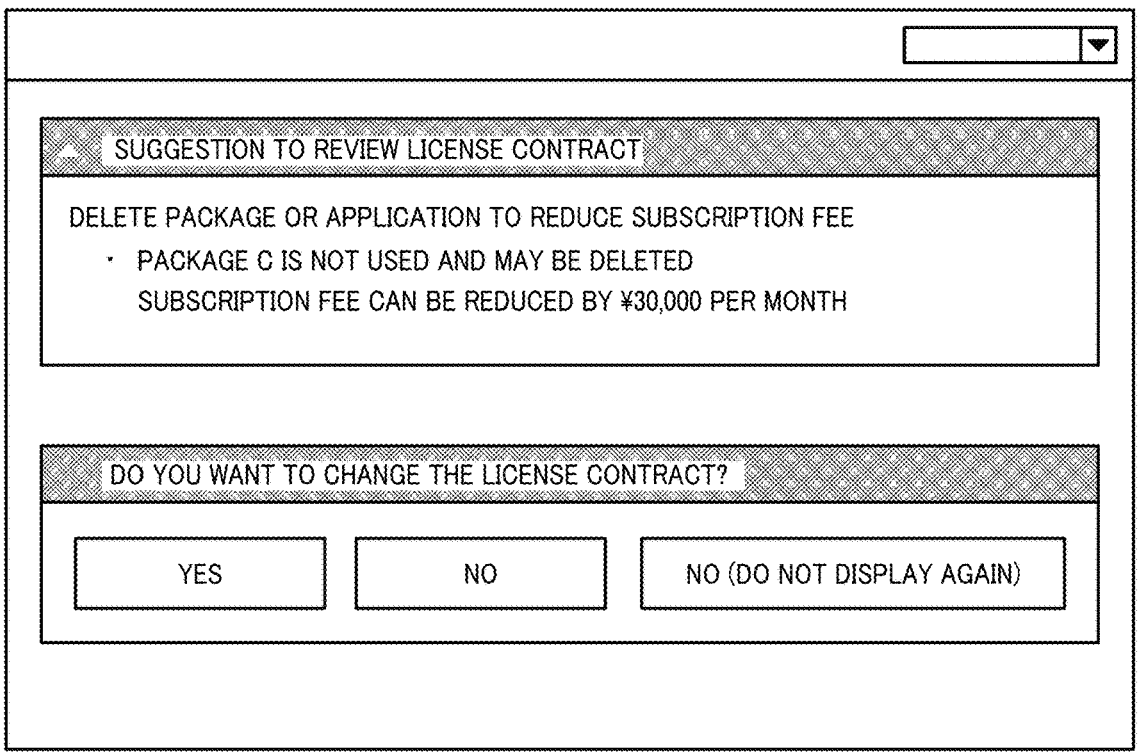

FIGS. 22A and 22B are diagrams illustrating examples of screens for suggesting deletion of the application or package without describing a reason. FIG. 22A is a diagram illustrating an example of a screen suggesting deletion of the application or package, and FIG. 22B is a diagram illustrating a modified example of the screen. The screen illustrated in FIG. 22A indicates a suggestion to delete the package C and the amount of reduction in the subscription fee compared to the current contract.

The screen illustrated in FIG. 22B also displays the suggestion that the application or the package is to be deleted and the amount of reduction in the subscription fee, but further, the button for selecting whether to change the license contract is displayed. By selecting the YES button, the screen transitions to receive a change of the license contract, and by selecting the NO button, the screen is closed. Also, on this screen, the button to cancel the display for selecting whether to change the contract is displayed. By pressing this button, the screen for only suggesting the deletion of the application as illustrated in FIG. 22A is displayed thereafter.

Figure 23A:
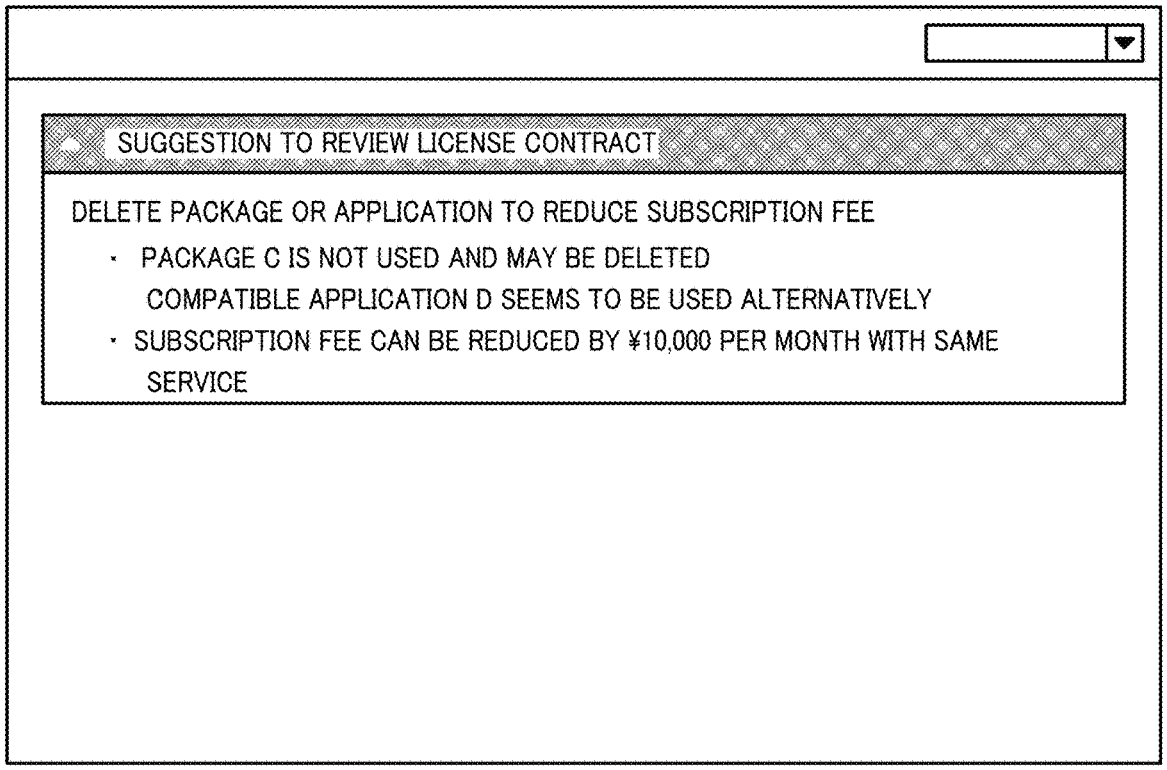
FIGS. 23A and 23B are diagrams illustrating examples of screens for suggesting deletion of the application describing the reason.
Figure 23B:
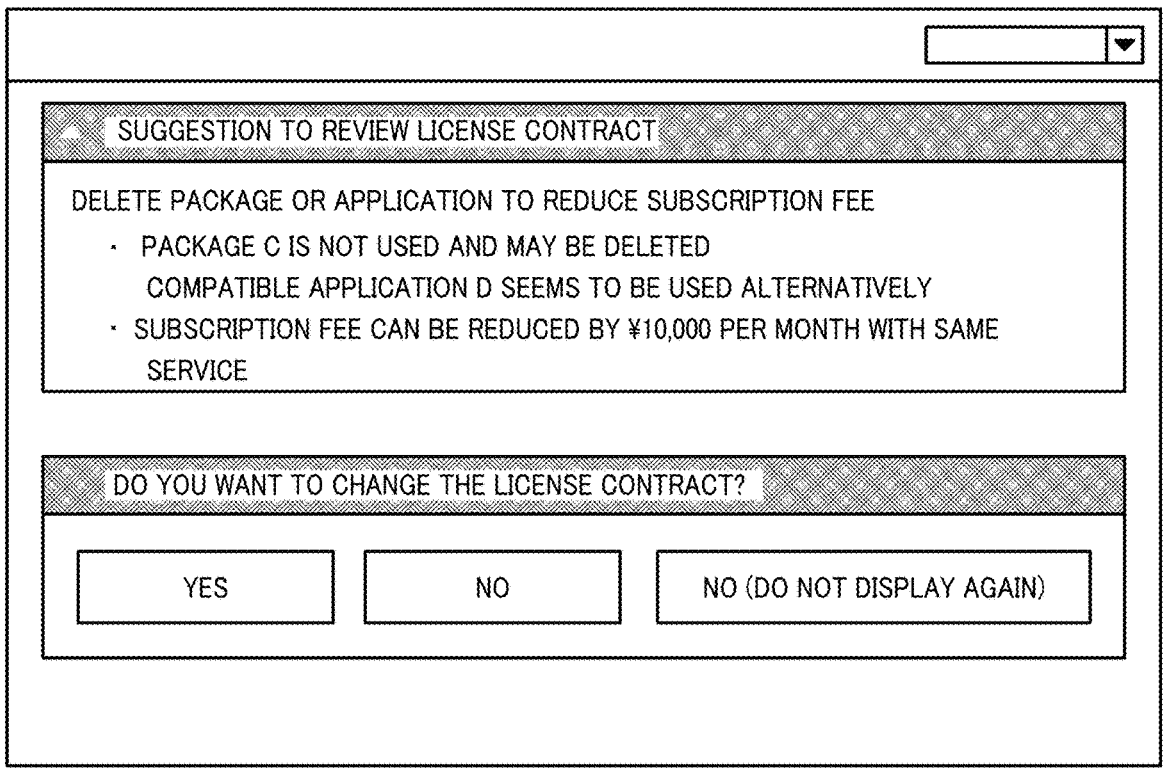

FIGS. 23A and 23B are diagrams illustrating examples of screens for suggesting deletion of the application or package together with the reason. FIG. 23A is a diagram illustrating an example of a screen suggesting deletion of the package, and FIG. 23B is a diagram illustrating a modified example of the screen. In FIG. 23A, a reason is displayed in addition to the suggestion to delete the package C and reduction in the subscription fee compared to the current contract. In the example illustrated in FIG. 23A, the fact that the compatible application is used instead of the package suggested to be deleted is displayed as the reason.

The screen illustrated in FIG. 23B also displays the suggestion to delete the package and the amount of reduction in the subscription fee, but further, the button for selecting whether to change the license contract is displayed. By pressing the YES button, the screen transitions to receive a change of the license contract, and by pressing the NO button, the screen is closed. Also, on this screen, the button to cancel the display for selecting whether to change the contract is displayed. By pressing this button, the screen for only suggesting the deletion of the application or package as illustrated in FIG. 23A is displayed thereafter.

The process for preparing the reason for deleting the application or package is described above, and a process for preparing the reason for reducing the number of users is described below. The reasons for reducing the number of users include a reason that users with a specific role do not use the application, and a reason that only guest users are using the application.

Initially, the license contract is concluded assuming that users in any role will use the application, but when referring to the actual usage, users in a specific role may not be using the application. In such a case, the reason for reducing the number of users can be that the user of the specific role is not using the application. For example, at the time of the initial contract, the license contract was such that the tenant administrator could also use the application, but the customer's operation has changed since then and the tenant administrator rarely uses the application.

Initially, the user license contract or the device license contract was concluded to cover all users belonging to the tenant so that the application required by the guest user can be used by all users in the tenant, but when referring to the actual usage, only the guest user may be using the application. In such a case, it is possible to suggest reducing the user license, for example, to make a user license contract for only one user, and the reason for reducing the number of users is that the only the guest users are using the application.

FIG. 24 is a flowchart illustrating an example of a process for preparing the reason for reducing the number of users. When the suggestion unit 81 makes the above comparison and suggests a change in the license contract and when the change includes reducing the number of users, the process is started from step S500. When the subscription fee for reduced number of users is calculated, it is determined that the suggestion includes reducing the number of users. Data stored in the database indicating whether the subscription fee has been calculated may be referenced, or variables in the program that indicate a calculation result may be referenced.

Note that this process does not have to be executed. When the process is not executed, the reason cannot be displayed along with the suggestion. As an example of not executing the process, the amount of information on the screen becomes too large and may cause difficulty in conveying the suggestion when the reason is displayed. When executing the process, the process can be executed between step S204 and step S205 in FIG. 14.

In step S501, whether the role of the user to be deleted is different from the role of other users in the tenant is determined. Referring to the user data of the tenant, the role of the user to be deleted with the role of the other user are compared. When no other user has the same role as the user to be deleted, it is determined that the role of the user to be deleted is different from the role of the other user. When the roles are different, the process proceeds to step S502, and when there are users with the same role, the process proceeds to step S503.

In step S502, as the reason for suggesting deleting a user, the user with a particular role is not using the application is added.

In step S503, it is determined whether the user to be deleted is not the guest user and the application is not used by anyone other than the guest user. By referring to the user data of the tenant, it is determined that only the guest user is using the application, when all the users to be deleted are not guest users and all the users not to be deleted are guest users. On the contrary, when all the users to be deleted are guest users and all the users not to be deleted are other than guest users, it is determined that the guest user is not using the application.

In step S504, only the guest user is using the application, or only the user other than guest user is using the application is added as the reason for suggesting the deletion of the user. In step S505, the reason is also displayed when suggesting the deletion of the user. In step S506, the reason preparation process ends.

Figure 25A:
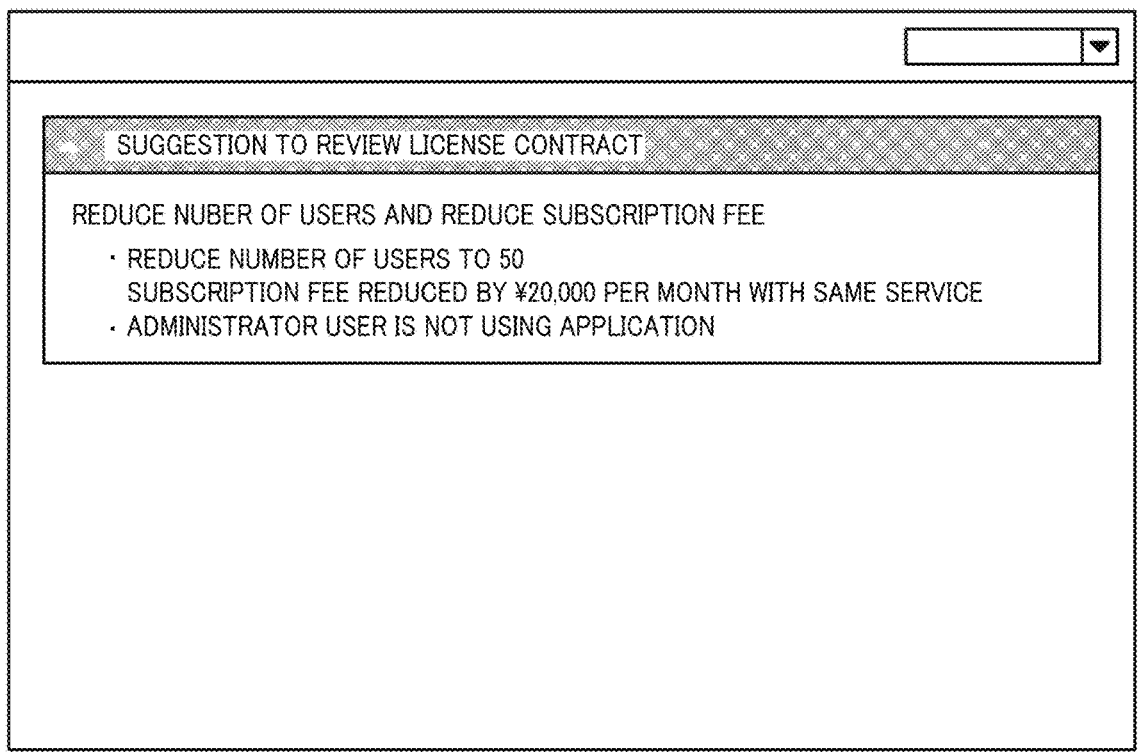
FIGS. 25A and 25B are diagrams illustrating examples of screens for suggesting a reduction in users describing the reason.
Figure 25B:
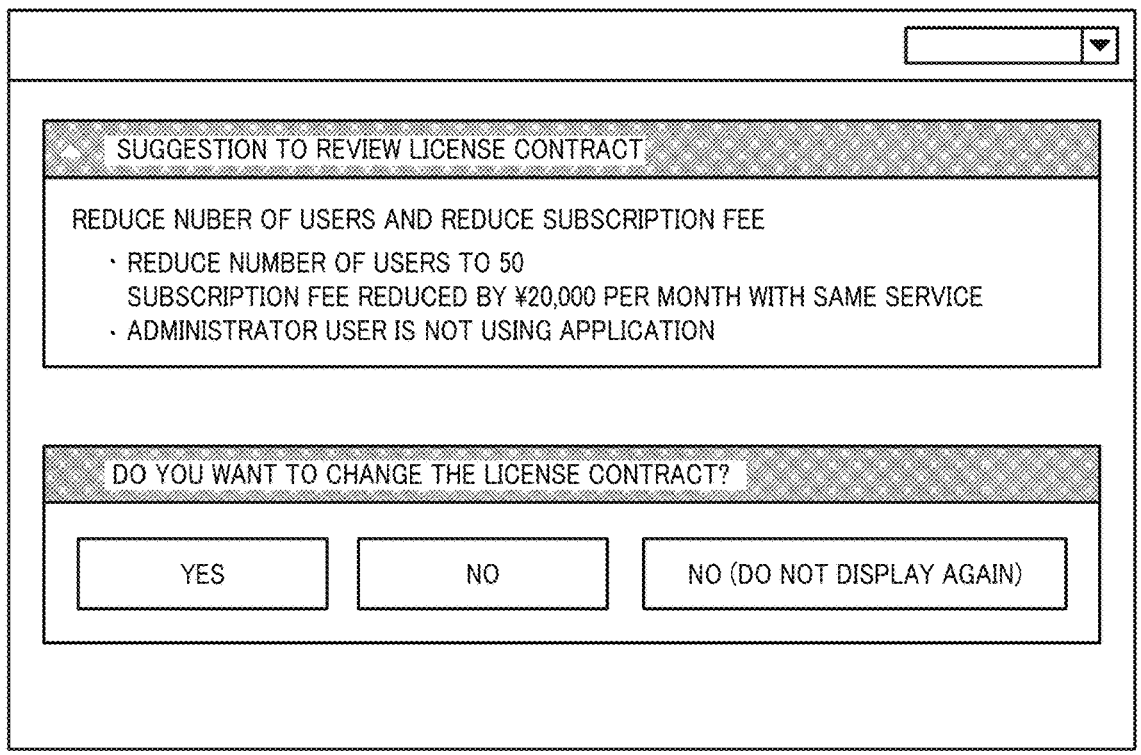

FIGS. 25A and 25B are diagrams illustrating examples of screens for suggesting a reduction in users with the reason. FIG. 25A is a diagram illustrating an example of a screen for suggesting the reduction of users, and FIG. 25B is a diagram illustrating a modified example of the screen. In FIG. 25A, a license contract with the reduced number of users, in this example 50 users, is suggested and the reason is that the administrator user is not using the application.

The screen illustrated in FIG. 25B also suggests a new license contract and displays the reason, and further, the button for selecting whether to change the license contract is displayed. By pressing the YES button, the screen transitions to receive a change of the license contract, and by pressing the NO button, the screen is closed. Also, on this screen, the button to cancel the display for selecting whether to change the contract is displayed. By pressing this button, the screen for only suggesting the deletion of the package as illustrated in FIG. 25A is displayed thereafter.

Figure 26A:
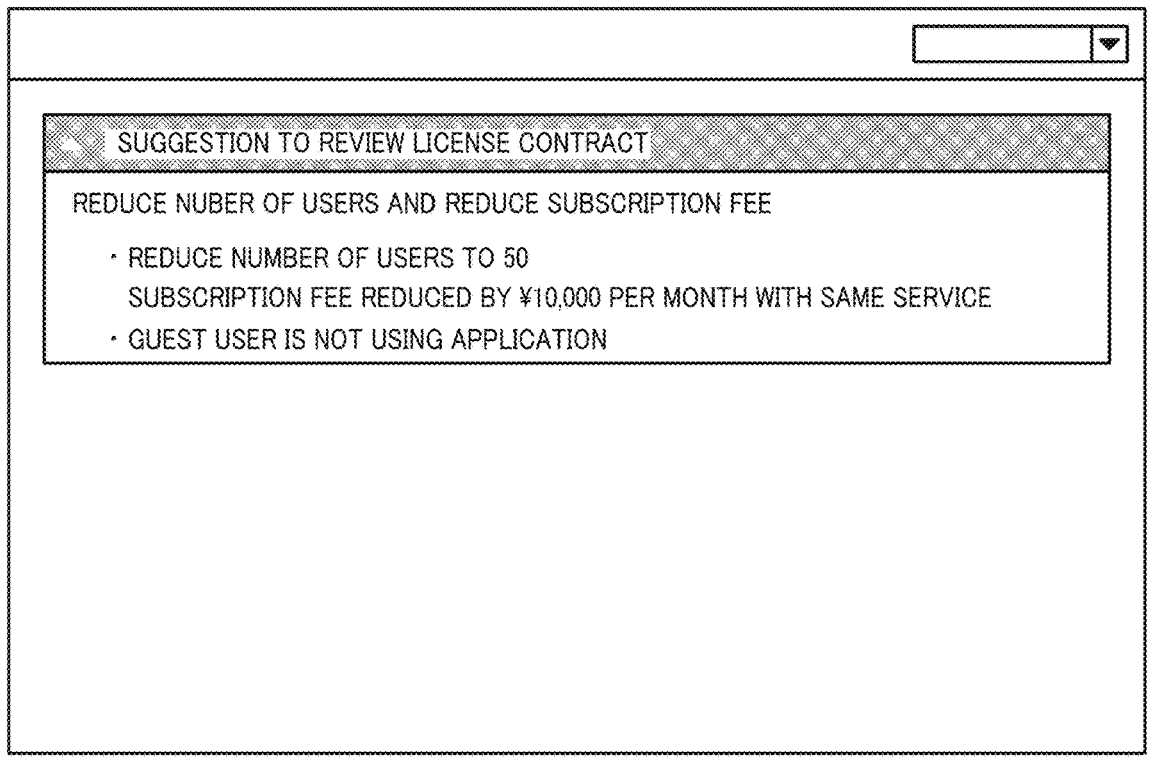
FIGS. 26A and 26B are diagrams illustrating examples of screens for suggesting a reduction in guest users describing the reason.
Figure 26B:
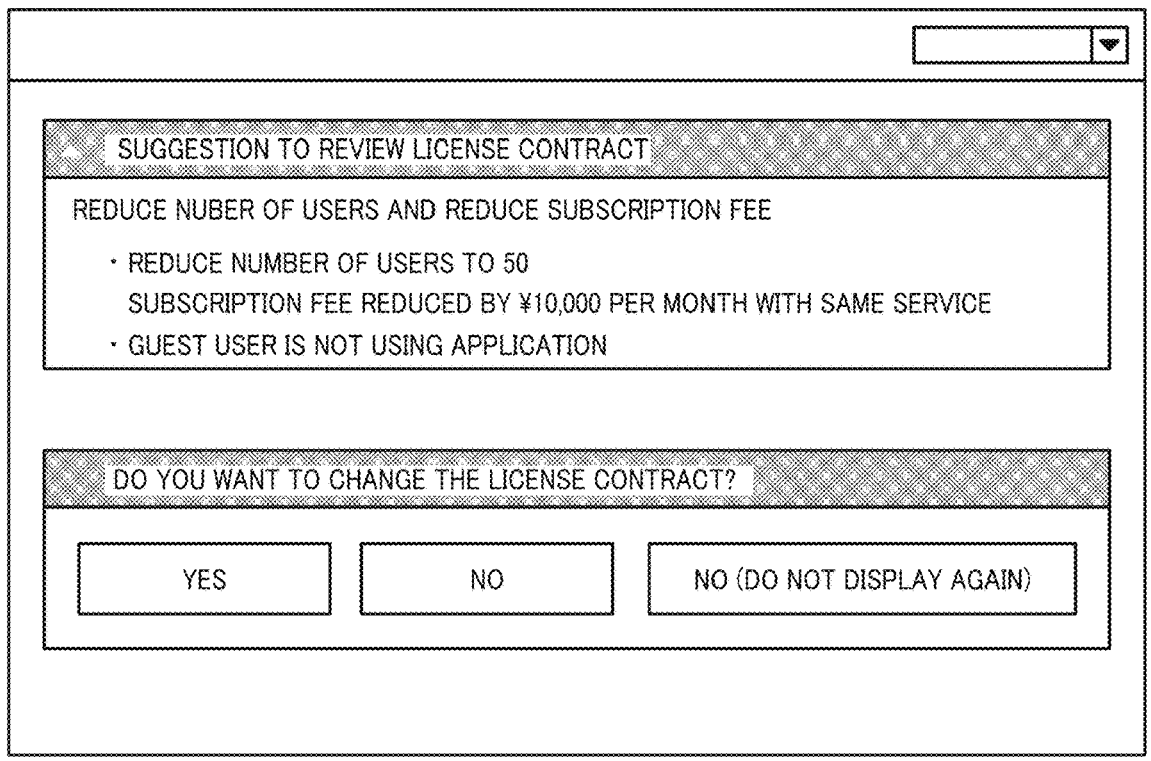

FIGS. 26A and 26B are diagrams illustrating examples of screens for suggesting a reduction in guest users with a reason. FIG. 26A is a diagram illustrating an example of the screen suggesting the reduction in guest users, and FIG. 26B is a diagram illustrating a modified example of the screen. In FIG. 26A, a suggestion is made to reduce the guest users whose authority is restricted compared to a normal user. The guest user may be a user with limited authority or may be provided as a service for an anonymous user associated with the tenant. For anonymous users, it is displayed whether to stop the guest user service.

The screen illustrated in FIG. 26B also displays a suggestion for reducing guest users, and also displays a button for selecting whether to change the license contract. By pressing the YES button, the screen transitions to receive a change of the license contract, and by pressing the NO button, the screen is closed. Also, on this screen, the button to cancel the display for selecting whether to change the contract is displayed. By pressing this button, the screen presenting only suggestion for reducing guest users as illustrated in FIG. 26A is displayed thereafter.

As explained above, by suggesting a change in the license contract, the customer can receive from the service provider, a suggestion for subscription fee corresponding to the received valuer and it is possible to prevent a decrease in customer satisfaction.

Although one embodiment of the present disclosure has been described so far, the present disclosure is not limited to the above-described embodiment, and the components of the present embodiment are changed or deleted, or the components of the present embodiment are used. It can be changed within the range that can be conceived by those skilled in the art, such as adding other components, and is included in the scope of the present disclosure as long as the effects of the present disclosure are exhibited in any of the embodiments.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing apparatus comprising:
circuitry configured to:
store in one or more memories, information on execution of each of a plurality of applications, which are available for use under a license contract; and
output on a visible screen a suggestion to change the license contract from a current license contract to another license contract according to a usage count of each application obtained from the information on execution of each application,
wherein the circuitry is further configured to output a reason for changing the license contract when suggesting a change to the license contract.

2. The information processing apparatus of claim 1, wherein the circuitry is further configured to:
generate a suggestion to delete one of the applications that has been executed a preset number of times or less among the plurality of applications; and
control a display to display the suggestion for changing the license contract.

3. The information processing apparatus of claim 1, wherein:
the license contract allows a plurality of users to use the plurality of applications, and
the circuitry is further configured to:
store in one or more memories, information on one or more users who executed the application for each of the plurality of applications; and
generate the suggestion for changing number of the plurality of users allowed to use the plurality of applications based on the usage count of each application by each user, obtained from the information on the plurality of applications and the information on the one or more users.

4. The information processing apparatus of claim 1, wherein the circuitry is further configured to:
store in one or more memories, information indicating presence or absence of an application compatible with each application of the plurality of applications; and
when suggesting a deletion of one of the plurality of applications allowed for use by the license contract, and when a compatible application exists for the application to suggest deletion, indicate presence of the compatible application as the reason for the deletion of the application, based on the usage count obtained from the information on the compatible application.

5. The information processing apparatus of claim 1, wherein the circuitry is further configured to:
store in one or more memories, information indicating a type of each application of the plurality of applications; and
when suggesting a deletion of the application included in the license contract,
indicate as a reason for the deletion of the application, that a particular type of the application is not being used based on the usage count obtained from the information on each application.

6. The information processing apparatus of claim 1, wherein the circuitry is further configured to:
store in one or more memories, information indicating a role of each user who executes each application; and
when suggesting a reduction of users, indicate as a reason for the reduction of the users, that the user belonging to a particular role is not using the application based on the usage count of each application by each user.

7. The information processing apparatus of claim 1 wherein the circuitry is further configured to:
store in one or more memories, information indicating whether each user who executed each application is a guest user; and
indicate as the reason for changing the license contract, that the application is used only by the guest user or not used by the guest user based on the usage count of each application by each user.

8. The information processing apparatus of claim 1, wherein the circuitry is further configured to:
receive a selection of whether to change the license contract according to the suggestion.

9. A service providing system comprising:
circuitry configured to:
store in one or more memories, information on execution of each of a plurality of applications, which are available for use under a license contract;
output on a visible screen a suggestion to change the license contract from a current license contract to another license contract according to a usage count of each application obtained from the information on execution of each application;
generate a suggestion to delete one of the applications that has been executed a preset number of times or less among the plurality of applications; and
control the visible screen to display the suggestion to delete the application that has been executed equal to or less than a preset number of times.

10. A method for outputting suggestion to change a license contract, the method comprising:
storing in one or more memories, information on execution of each of a plurality of applications, which are available for use under the license contract;
outputting on a visible screen suggestion to change the license contract from a current license contract to another license contract according to a usage count of each application obtained from the information on execution of each application; and
outputting a reason for changing the license contract when outputting the suggestion to change the license contract.

11. The method of claim 10, further comprising:
generating a suggestion to delete the application that has been executed equal to or less than a preset number of times among the plurality of applications; and
controlling the visible screen to display the suggestion to delete the application that has been executed equal to or less than a preset number of times.

12. The method of claim 10, wherein:
the license contract allows a plurality of users to use the plurality of applications, and
the method further comprises:
storing in one or more memories, information on one or more users who executed the application for each of the plurality of applications; and
generating the suggestion for changing number of the plurality of users allowed to use the plurality of applications based on the usage count of each application by each user, obtained from the information on the plurality of applications and the information on the one or more users.

13. The method of claim 10, further comprising:
storing in one or more memories, information indicating presence or absence of an application compatible with each application of the plurality of applications; and
when suggesting a deletion of one of the plurality of applications allowed for use by the license contract, and when a compatible application exists for the application to suggest deletion, indicating presence of the compatible application as the reason for the deletion of the application, based on the usage count obtained from the information on the compatible application.

14. The method of claim 10, further comprising:
storing in one or more memories, information indicating a type of each application of the plurality of applications; and
indicating, when suggesting a deletion of the application included in the license contract, as a reason for the deletion of the application, that a particular type of the application is not being used based on the usage count obtained from the information on each application.

15. The method of claim 10, further comprising:
storing in one or more memories, information indicating a role of each user who executes each application; and
indicating, when suggesting a reduction of users, as a reason for the reduction of the users, that the user belonging to a particular role is not using the application based on the usage count of each application by each user.

16. The method of claim 10, further comprising:
storing in one or more memories, information indicating whether each user who executed each application is a guest user; and
indicating as the reason for changing the license contract, that the application is used only by the guest user or not used by the guest user based on the usage count of each application by each user.

17. The method of claim 10, further comprising:
receiving a selection of whether to change the license contract according to the suggestion.

* * * * *